(12) United States Patent
Kato

(10) Patent No.: US 8,223,437 B2
(45) Date of Patent: Jul. 17, 2012

(54) WIDE-ANGLE ZOOM LENS SYSTEM

(75) Inventor: Koji Kato, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 12/697,382

(22) Filed: Feb. 1, 2010

(65) Prior Publication Data

US 2010/0195219 A1 Aug. 5, 2010

(30) Foreign Application Priority Data

Feb. 3, 2009 (JP) ................................ 2009-022627

(51) Int. Cl.
*G02B 15/14* (2006.01)
(52) U.S. Cl. .......................... 359/682; 359/680; 359/689
(58) Field of Classification Search .......... 359/680–682, 359/686, 689; 396/72–88; 348/240.99–240.3, 348/335–369
See application file for complete search history.

(56) References Cited

U.S. PATENT DOCUMENTS

| | | | |
|---|---|---|---|
| 5,721,642 A | 2/1998 | Shibayama et al. | |
| 6,246,529 B1 | 6/2001 | Sensui | |
| 6,327,098 B1 | 12/2001 | Sensui | |
| 7,505,211 B2 | 3/2009 | Horneber | |
| 2004/0156120 A1* | 8/2004 | Yoneyama | 359/680 |
| 2007/0002457 A1 | 1/2007 | Saori | |
| 2007/0002458 A1 | 1/2007 | Saori | |
| 2007/0002459 A1 | 1/2007 | Saori | |
| 2007/0091461 A1 | 4/2007 | Saori | |
| 2008/0252993 A1 | 10/2008 | Eguchi | |
| 2010/0195216 A1* | 8/2010 | Miyazaki et al. | 359/686 |

FOREIGN PATENT DOCUMENTS

| | | |
|---|---|---|
| JP | 8-248312 | 9/1996 |
| JP | 2000-131611 | 5/2000 |
| JP | 2000-131612 | 5/2000 |

* cited by examiner

*Primary Examiner* — Darryl J Collins
(74) *Attorney, Agent, or Firm* — Greenblum & Bernstein P.L.C.

(57) ABSTRACT

A wide-angle zoom lens system includes a negative fist lens group, a positive second lens group, and a positive third lens group, in this order from the object.
Upon zooming from the short focal length extremity to the long focal length extremity, each of the negative fist lens group, the positive second lens group and the positive third lens group move along the optical axis thereof while a distance between the negative fist lens group and the positive second lens group decreases, and a distance between the positive second lens group and the positive third lens group also decreases.
The wide-angle zoom lens system satisfies the following condition:

$$2.45 < f3/fw < 3.5 \qquad (1)$$

wherein
f3 designates the focal length of the positive third lens group; and
fw designates the focal length of the entire wide-angle zoom lens system at the short focal length extremity.

20 Claims, 29 Drawing Sheets

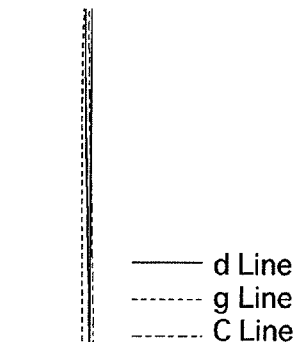
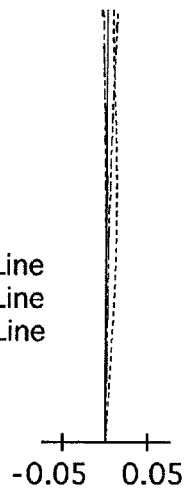
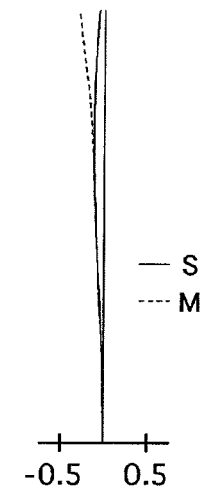
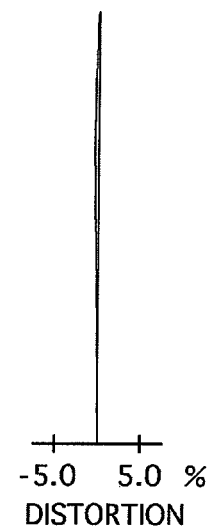
Fig. 2A  FNo.=1:4.0
-0.5  0.5
SPHERICAL ABERRATION
CHROMATIC ABERRATION
— d Line
----- g Line
------ C Line
Fig. 2B  Y=14.24
-0.05  0.05
LATERAL CHROMATIC ABERRATION
Fig. 2C  Y=14.24
-0.5  0.5
ASTIGMATISM
— S
---- M
Fig. 2D  Y=14.24
-5.0  5.0  %
DISTORTION
Fig. 3A  Y=0.00
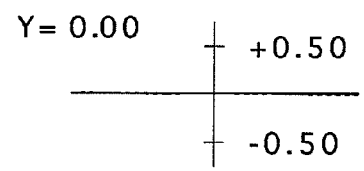
+0.50
-0.50
Fig. 3B  Y=6.00
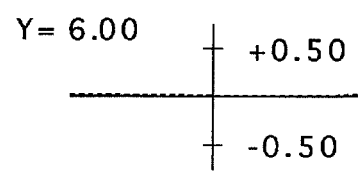
+0.50
-0.50
Fig. 3C  Y=10.00
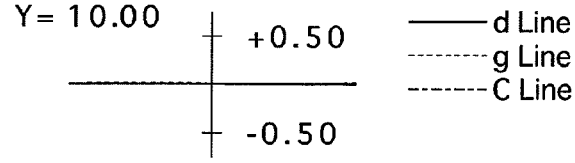
+0.50
-0.50
— d Line
----- g Line
------ C Line

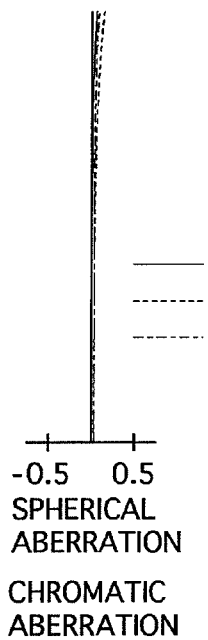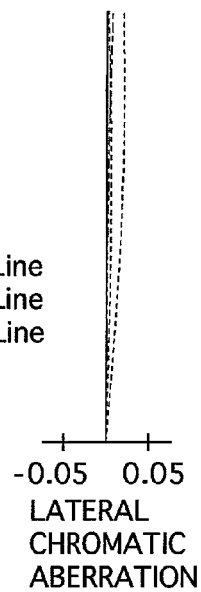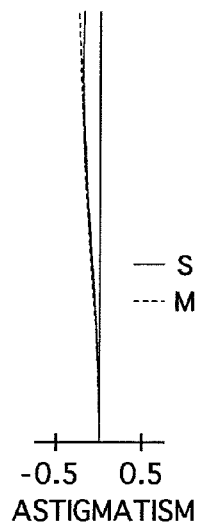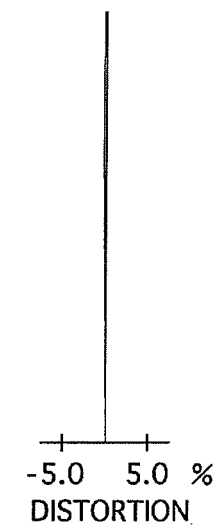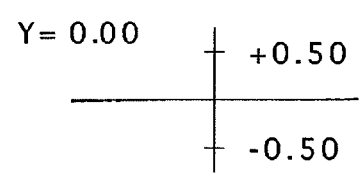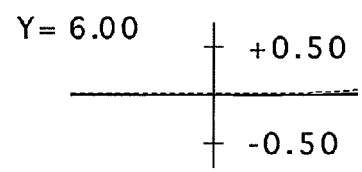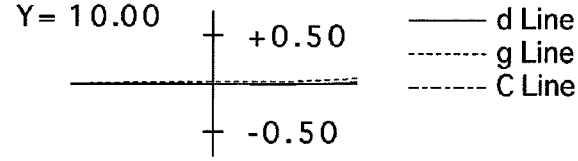

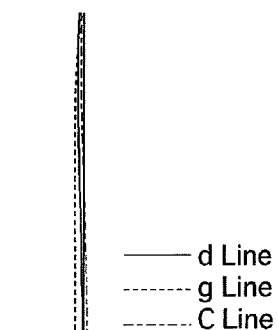
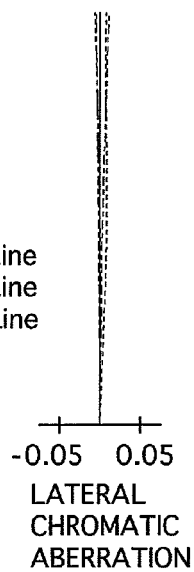
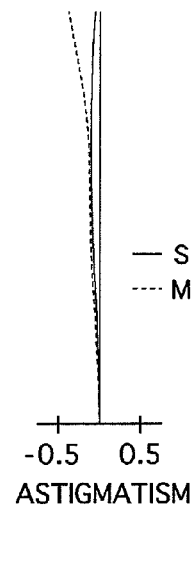
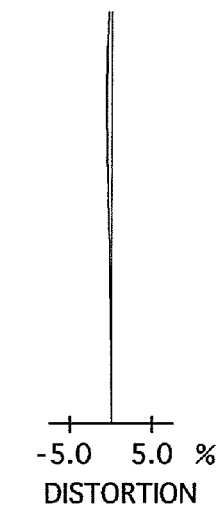
Fig. 8A FNo.=1:3.9 SPHERICAL ABERRATION CHROMATIC ABERRATION
Fig. 8B Y=14.24 LATERAL CHROMATIC ABERRATION
Fig. 8C Y=14.24 ASTIGMATISM
Fig. 8D Y=14.24 DISTORTION
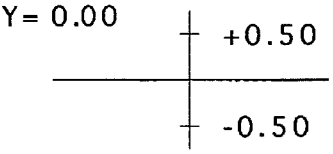
Fig. 9A  Y=0.00
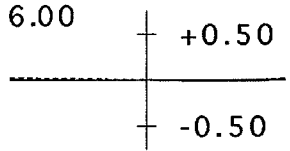
Fig. 9B  Y=6.00
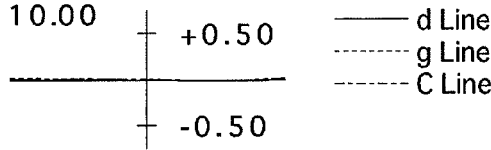
Fig. 9C  Y=10.00

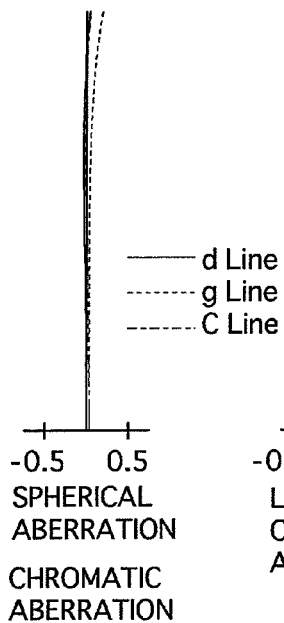
Fig.11A
FNo.=1:4.3
—— d Line
------- g Line
------ C Line
-0.5  0.5
SPHERICAL
ABERRATION
CHROMATIC
ABERRATION
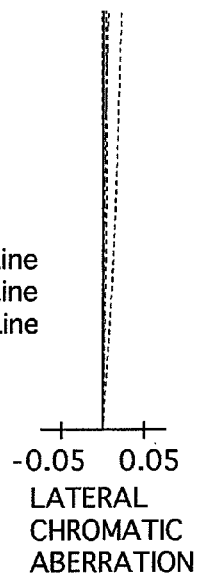
Fig.11B
Y=14.24
-0.05  0.05
LATERAL
CHROMATIC
ABERRATION
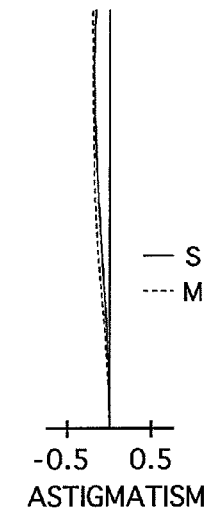
Fig.11C
Y=14.24
— S
---- M
-0.5  0.5
ASTIGMATISM
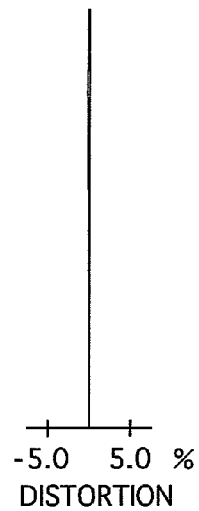
Fig.11D
Y=14.24
-5.0  5.0 %
DISTORTION
Fig. 12A   Y=0.00
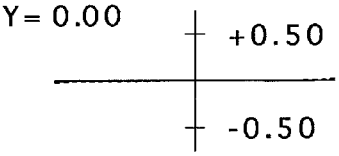
+0.50
-0.50
Fig. 12B   Y=6.00
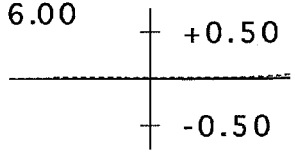
+0.50
-0.50
Fig. 12C   Y=10.00
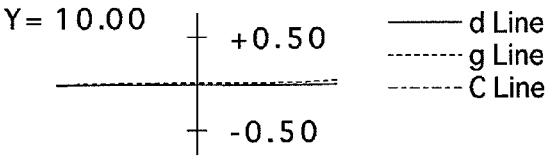
+0.50
-0.50
—— d Line
------- g Line
------ C Line Fig.14A
FNo.=1:3.9
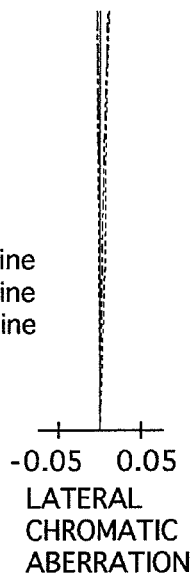
-0.5   0.5
SPHERICAL
ABERRATION
CHROMATIC
ABERRATION
—— d Line
------ g Line
------- C Line
Fig.14B
Y=14.24
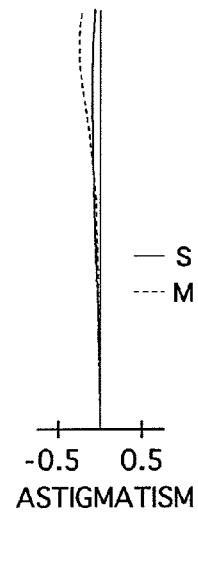
-0.05  0.05
LATERAL
CHROMATIC
ABERRATION
Fig.14C
Y=14.24
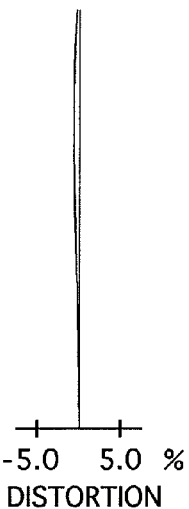
-0.5   0.5
ASTIGMATISM
—— S
---- M
Fig.14D
Y=14.24
-0.5   0.5
ASTIGMATISM
-5.0   5.0 %
DISTORTION
Fig. 15A     Y= 0.00
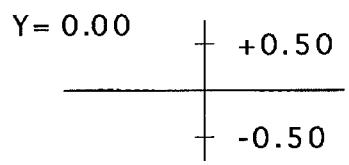
+0.50
-0.50
Fig. 15B     Y= 6.00
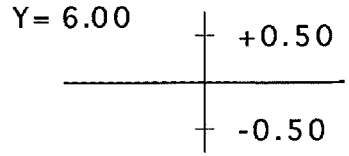
+0.50
-0.50
Fig. 15C     Y= 10.00
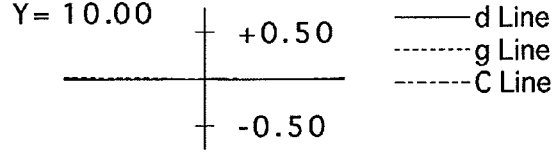
+0.50
-0.50
—— d Line
------ g Line
------- C Line

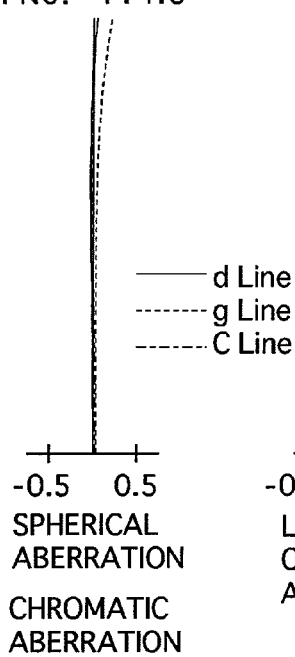
Fig.17A
FNo.=1:4.3
—— d Line
------- g Line
------ C Line
-0.5  0.5
SPHERICAL
ABERRATION
CHROMATIC
ABERRATION
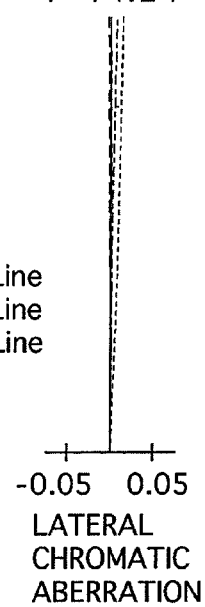
Fig.17B
Y=14.24
-0.05  0.05
LATERAL
CHROMATIC
ABERRATION
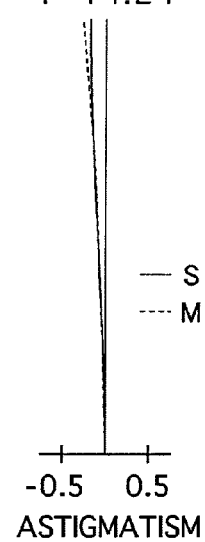
Fig.17C
Y=14.24
— S
---- M
-0.5  0.5
ASTIGMATISM
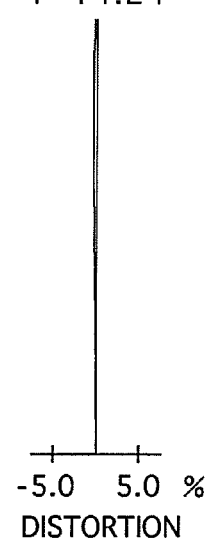
Fig.17D
Y=14.24
-5.0  5.0  %
DISTORTION
Fig. 18A
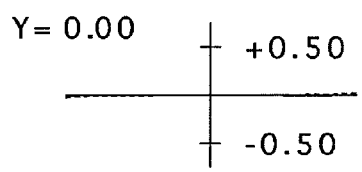
Y=0.00    +0.50
          -0.50
Fig. 18B
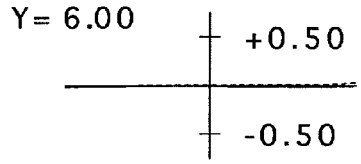
Y=6.00    +0.50
          -0.50
Fig. 18C
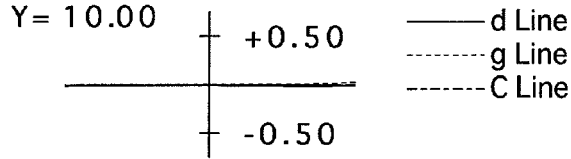
Y=10.00   +0.50       —— d Line
                      ------- g Line
          -0.50       ------ C Line

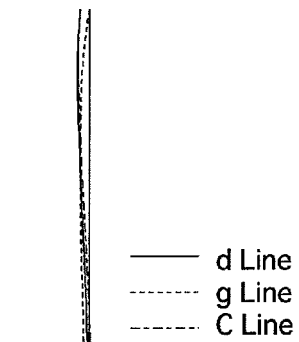
Fig.20A
FNo.=1:4.0
Fig.20B
Y=14.24
Fig.20C
Y=14.24
Fig.20D
Y=14.24
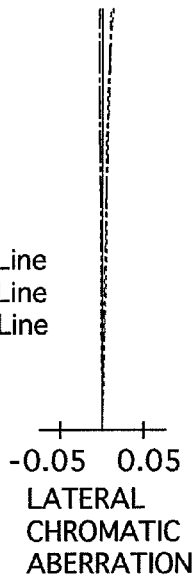
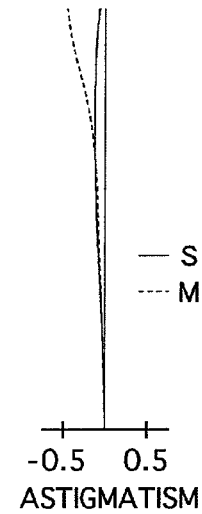
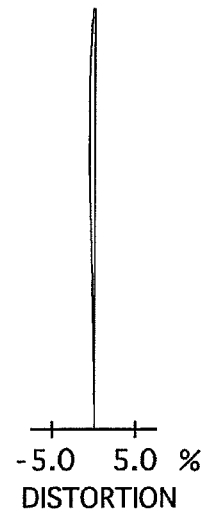
—— d Line
------- g Line
----- C Line
— S
--- M
-0.5   0.5
SPHERICAL
ABERRATION
CHROMATIC
ABERRATION
-0.05  0.05
LATERAL
CHROMATIC
ABERRATION
-0.5   0.5
ASTIGMATISM
-5.0   5.0 %
DISTORTION
Fig. 21A   Y=0.00
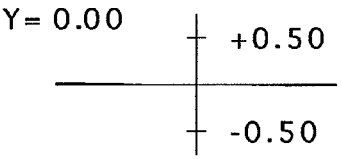
Fig. 21B   Y=6.00
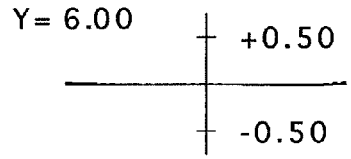
Fig. 21C   Y=10.00
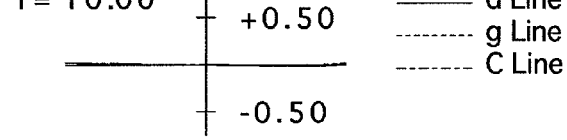
—— d Line
------- g Line
----- C Line

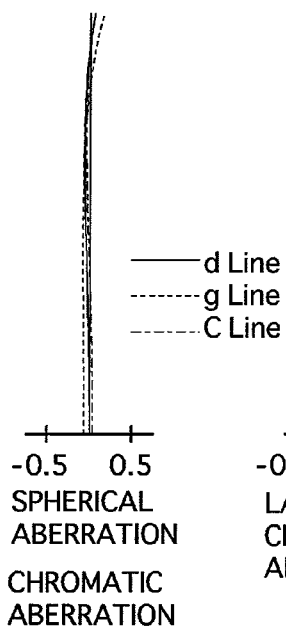
Fig.23A
FNo.=1:4.3
—— d Line
------- g Line
----- C Line
-0.5  0.5
SPHERICAL
ABERRATION
CHROMATIC
ABERRATION
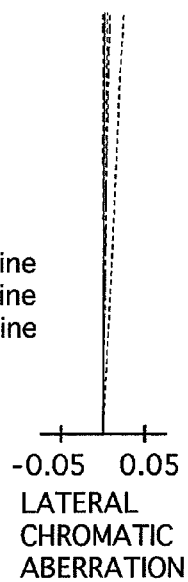
Fig.23B
Y=14.24
-0.05  0.05
LATERAL
CHROMATIC
ABERRATION
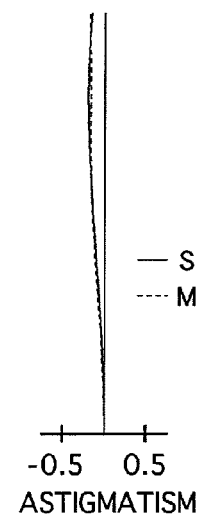
Fig.23C
Y=14.24
— S
---- M
-0.5  0.5
ASTIGMATISM
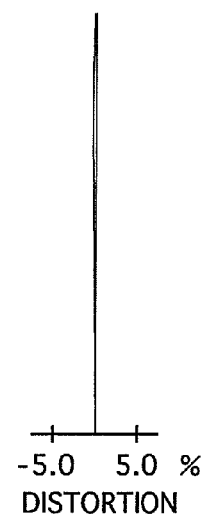
Fig.23D
Y=14.24
-5.0  5.0 %
DISTORTION
Fig. 24A  Y=0.00
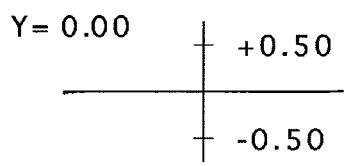
+0.50
-0.50
Fig. 24B  Y=6.00
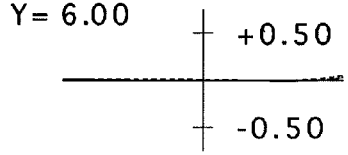
+0.50
-0.50
Fig. 24C  Y=10.00
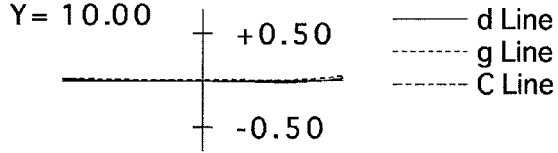
+0.50
-0.50
—— d Line
------- g Line
----- C Line

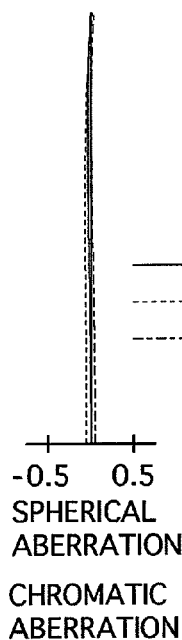
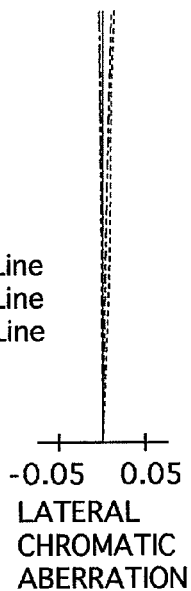
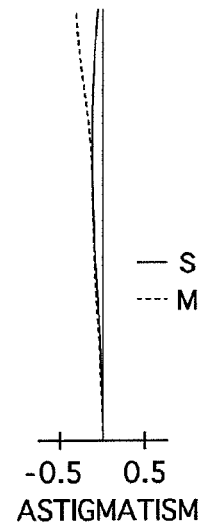
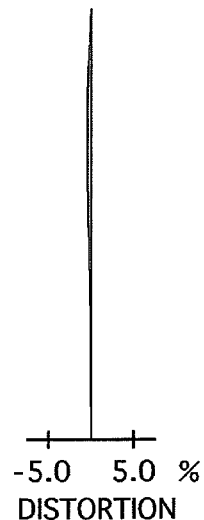
Fig.26A  Fig.26B  Fig.26C  Fig.26D
FNo.=1:4.0  Y=14.24  Y=14.24  Y=14.24
— d Line
------- g Line
------ C Line
— S
--- M
-0.5  0.5        -0.05  0.05       -0.5  0.5        -5.0  5.0 %
SPHERICAL        LATERAL           ASTIGMATISM      DISTORTION
ABERRATION       CHROMATIC
CHROMATIC        ABERRATION
ABERRATION
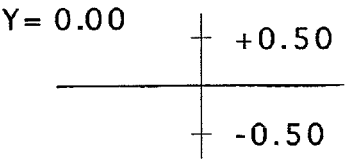
Fig. 27A  Y=0.00  +0.50
                  -0.50
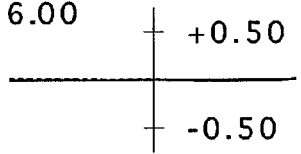
Fig. 27B  Y=6.00  +0.50
                  -0.50
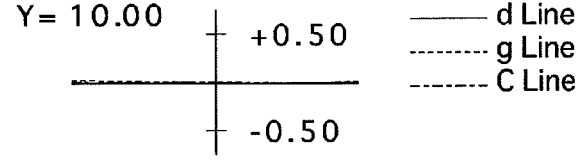
Fig. 27C  Y=10.00  +0.50    ——— d Line
                            -------- g Line
                   -0.50    ------ C Line

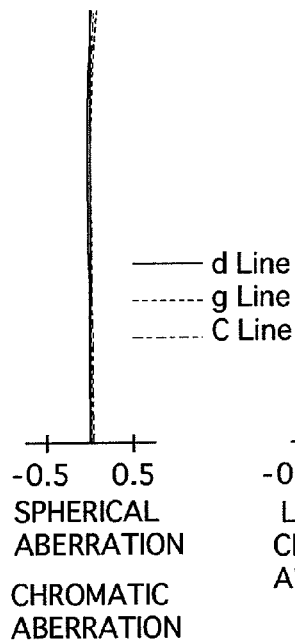
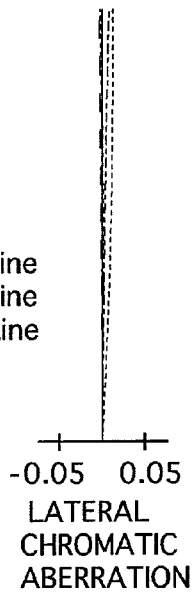
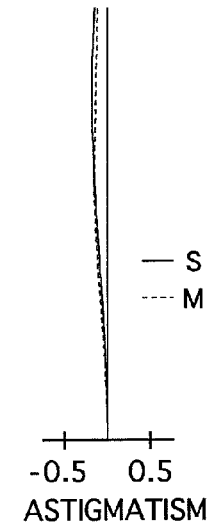
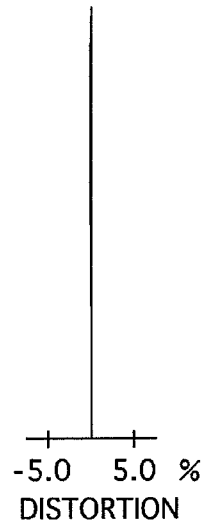
Fig. 29A FNo.=1:4.3
Fig. 29B Y=14.24
Fig. 29C Y=14.24
Fig. 29D Y=14.24
—— d Line
------ g Line
------ C Line
—— S
---- M
-0.5  0.5
SPHERICAL ABERRATION
CHROMATIC ABERRATION
-0.05  0.05
LATERAL CHROMATIC ABERRATION
-0.5  0.5
ASTIGMATISM
-5.0  5.0 %
DISTORTION
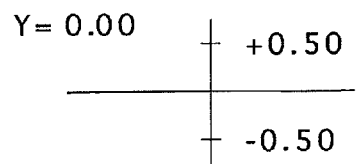
Fig. 30A  Y=0.00  +0.50 / -0.50
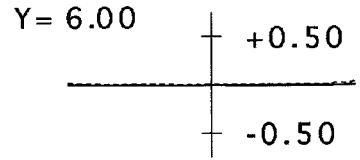
Fig. 30B  Y=6.00  +0.50 / -0.50
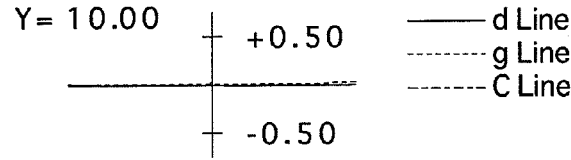
Fig. 30C  Y=10.00  +0.50 / -0.50
—— d Line
------ g Line
------ C Line

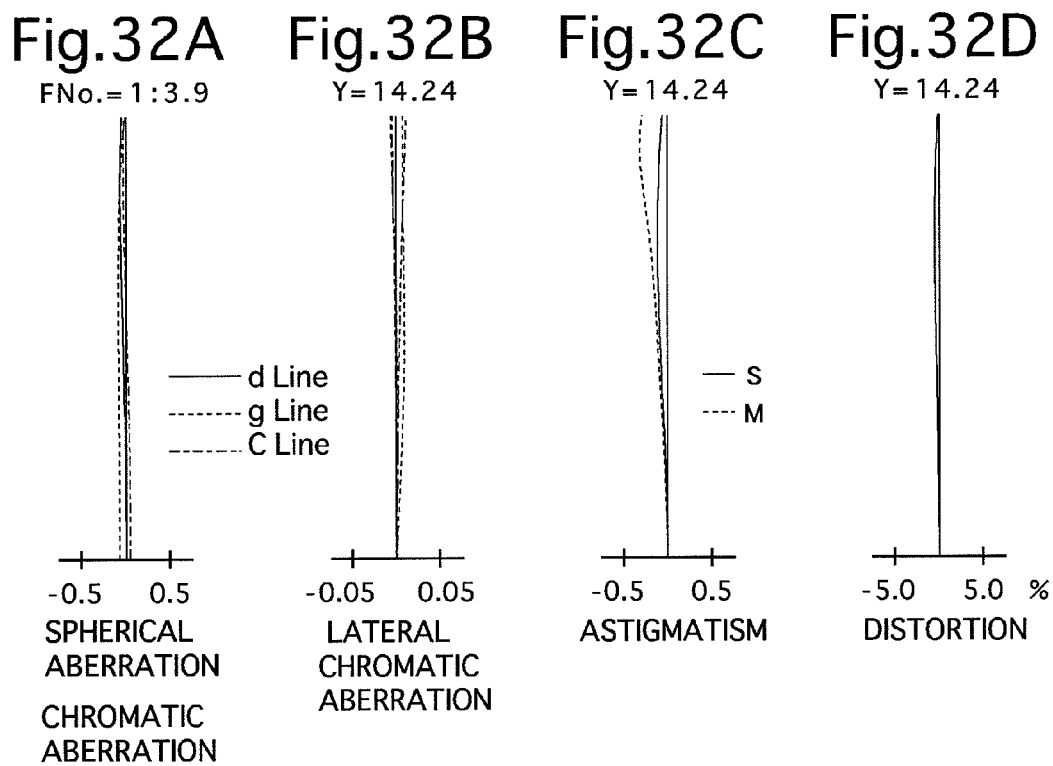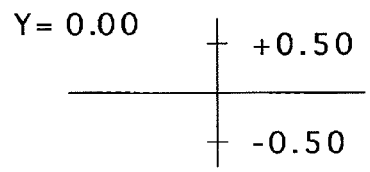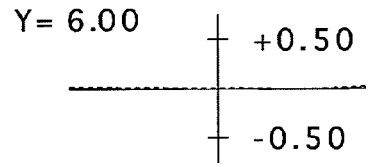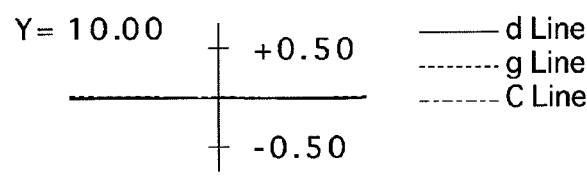

Fig.35A
FNo.=1:4.3
Fig.35B
Y=14.24
Fig.35C
Y=14.24
Fig.35D
Y=14.24
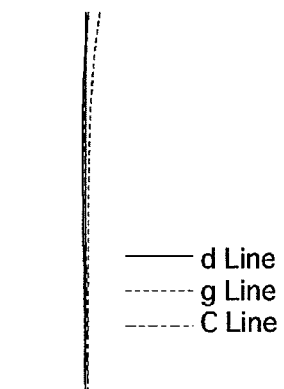
—— d Line
------ g Line
----- C Line
-0.5   0.5
SPHERICAL
ABERRATION
CHROMATIC
ABERRATION
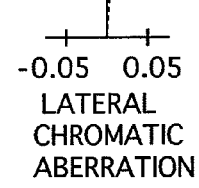
-0.05  0.05
LATERAL
CHROMATIC
ABERRATION
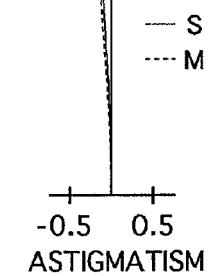
— S
---- M
-0.5   0.5
ASTIGMATISM
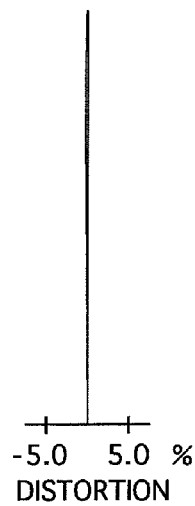
-5.0   5.0 %
DISTORTION
Fig. 36A    Y=0.00
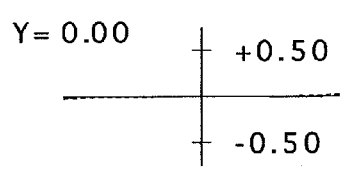
Fig. 36B    Y=6.00
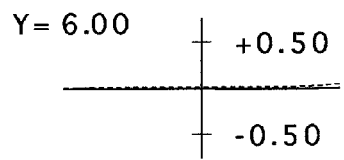
Fig. 36C    Y=10.00
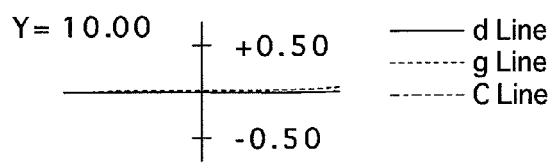
—— d Line
------ g Line
----- C Line

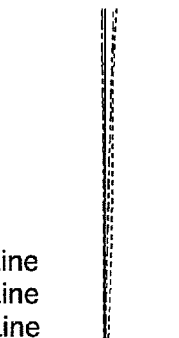
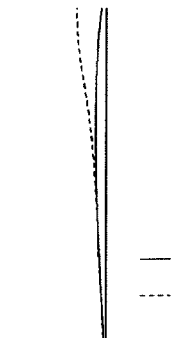
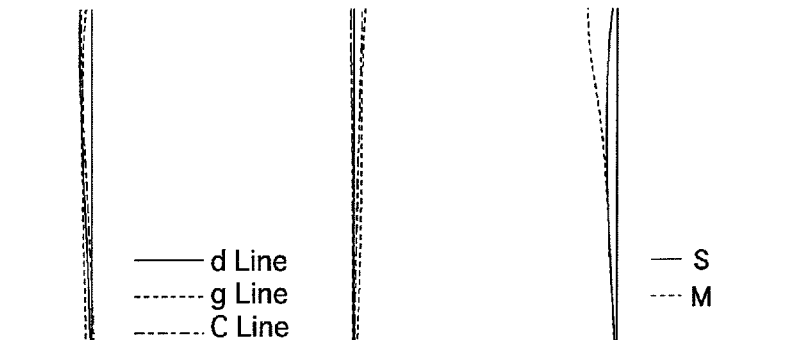
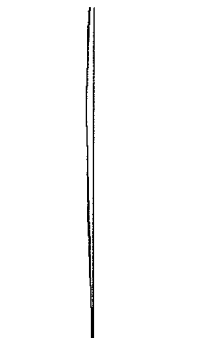
Fig.38A FNo.=1:4.0 SPHERICAL ABERRATION CHROMATIC ABERRATION
Fig.38B Y=14.24 LATERAL CHROMATIC ABERRATION
Fig.38C Y=14.24 ASTIGMATISM
Fig.38D Y=14.24 DISTORTION
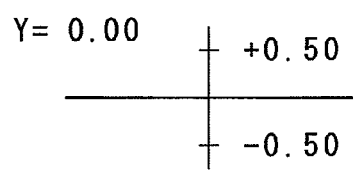
Fig. 39A  Y= 0.00
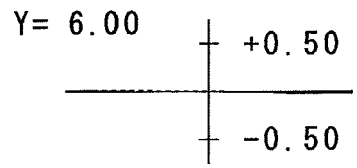
Fig. 39B  Y= 6.00
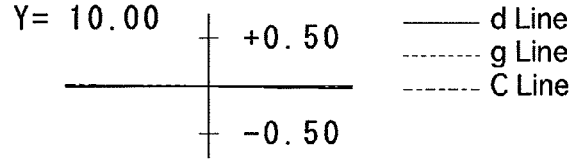
Fig. 39C  Y= 10.00

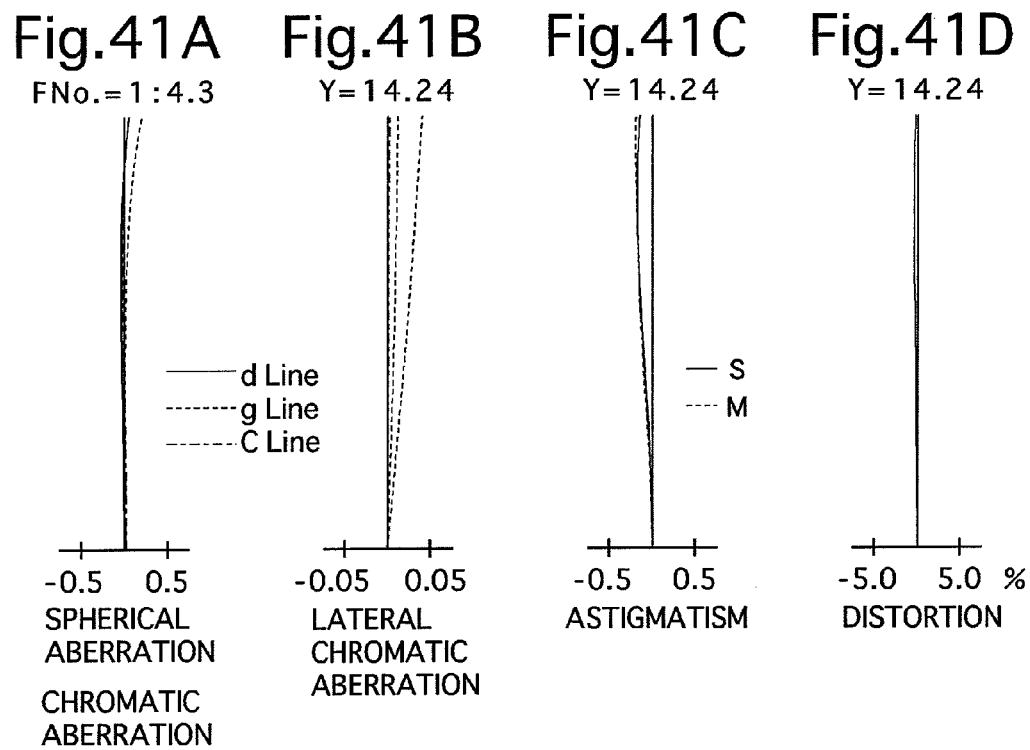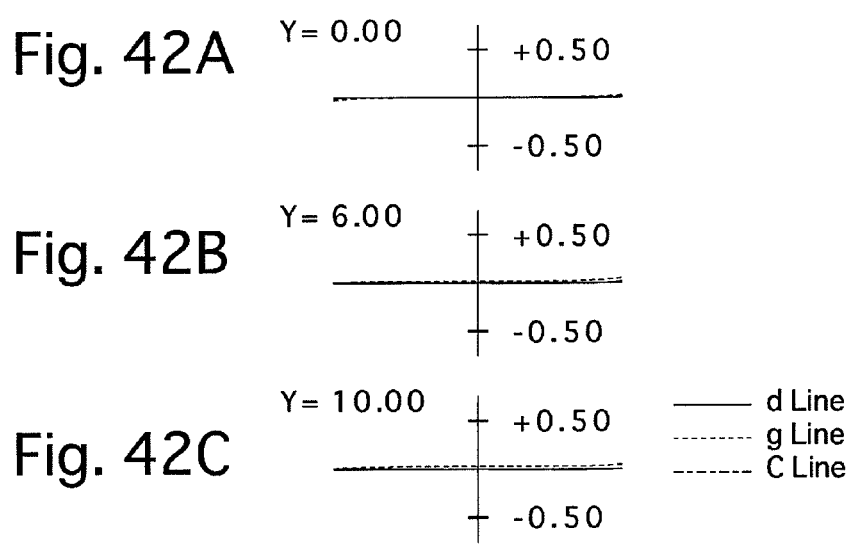

WIDE-ANGLE ZOOM LENS SYSTEM

BACKGROUND OF THE INVENTION

1. Field of the Invention

The present invention relates to a wide-angle zoom lens system having an angle-of-view exceeding 80° at the short focal length extremity for use mainly in an SLR (Single Lens Reflex) camera.

2. Description of Related Art

A wide-angle zoom lens system having an angle-of-view exceeding 80° at the short focal length extremity typically employs a retrofocus lens arrangement in which a negative lens group and a positive lens group are provided in this order from the object. Generally, a retrofocus lens arrangement provides a long back focal distance which satisfies the structural conditions to place a quick-return mirror in the SLR camera; and furthermore, each lens group needs to have a strong refractive power in order to maintain the compact (shorter) overall length of a wide-angle zoom lens system. However, if a strong refractive power is provided in each lens group, it is difficult to correct aberrations, such as distortion, field curvature, and astigmatism, at the short focal length extremity.

In recent exchangeable lenses for SLR cameras, there has been demand for high-speed focusing to cope with autofocusing operations. In a conventional focusing system for a wide-angle zoom lens system, a first-lens-group telescoping system in which the first lens group telescopes (advances and retracts) is generally employed. In this respect, in order to achieve an autofocus lens which can perform a high-speed focusing operation, the focusing lens group is desirably lighter (a reduced weight).

In Japanese Unexamined Patent Publication Nos. 2000-131611 and 2000-131612, distortion which occurs in the first lens group cannot be sufficiently corrected by the second lens group and therebehind, so that distortion still remains at the short focal length extremity. Moreover, focusing is performed by the first lens group, which is unsuitable for high-speed focusing.

In Japanese Unexamined Patent Publication No. H08-248312, distortion also remains at the short focal length extremity; and furthermore, in regard to focusing, Embodiments 1, 3 and 5 disclose focusing lens groups of three lens elements, Embodiment 7 discloses a focusing lens group of two lens elements, and Embodiment 4 discloses a focusing lens group of one lens element.

Compared to an arrangement in which the first lens group is moved in the optical axis direction to carry out focusing, Embodiments 1, 3 and 5 achieve a zoom lens system in which the lens diameters are reduced and a high-speed focusing operation is possible. However, the reduction of the lens diameters and the extent by which a high-speed focusing operation can be performed in Embodiments 1, 3 and 5 are insufficient compared to Embodiments 4 and 7. In Embodiments 4 and 7, a high-speed focusing operation is sufficiently possible with respect to the number of lens elements, and to the location of the focusing lens group. However, the moving space (a traveling distance in the optical axis direction) within which the focusing group is driven (moved) is small (short), so that the minimum photographing distance becomes longer. In addition, in Embodiment 7, a convex lens element is provided as the most object-side lens element, so that the lens diameter of the convex lens element is large.

SUMMARY OF THE INVENTION

The present invention provides a compact wide-angle zoom lens system in which aberrations, such as distortion and astigmatism, are suitably corrected over the entire zooming range.

Furthermore, the present invention provides a wide-angle zoom lens system which reduces aberration fluctuations, which occur upon focusing, down to a minimum by employing an internal-focusing lens arrangement, and achieves a shorter minimum photographing distance.

According to an aspect of the present invention, there is provided a wide-angle zoom lens system including a first lens group having a negative refractive power (hereinafter, a negative fist lens group), a second lens group having a positive refractive power (hereinafter, a positive second lens group), and a third lens group having a positive refractive power (hereinafter, a positive third lens group), in this order from the object.

Upon zooming from the short focal length extremity to the long focal length extremity, each of the negative fist lens group, the positive second lens group and the positive third lens group move along the optical axis thereof while a distance between the negative fist lens group and the positive second lens group decreases, and a distance between the positive second lens group and the positive third lens group also decreases.

The wide-angle zoom lens system satisfies the following condition:

$$2.45 < f3/fw < 3.5 \quad (1)$$

wherein f3 designates the focal length of the positive third lens group; and fw designates the focal length of the entire wide-angle zoom lens system at the short focal length extremity.

The wide-angle zoom lens system satisfies the following condition:

$$-0.7 < f1/f2 < -0.2 \quad (2)$$

wherein f1 designates the focal length of the negative fist lens group; and f2 designates the focal length of the positive second lens group.

It is practical for the positive second lens group to be moved toward the image in order to carryout a focusing operation from an object at infinity to an object at a closer distance.

The positive second lens group can be constituted by a positive single lens element, or by a cemented lens having a positive refractive power.

The negative fist lens group is preferably divided into a negative first sub-lens group and a positive second sub-lens group at the largest air-distance therebetween, in this order from the object; and, the negative first sub-lens group and the positive second sub-lens group satisfy the following condition:

$$0.6 < d1a\text{-}b/fw < 1.35 \quad (3)$$

wherein d1a-b designates the air-distance from the most image-side surface of the negative first sub-lens group to the most object-side surface of the positive second sub-lens group; and fw designates the focal length of the entire wide-angle zoom lens system at the short focal length extremity.

The negative fist lens group preferably includes a negative first lens element having a concave surface facing toward the image, a negative second lens element having a concave surface facing toward the image, and a positive third lens element having a convex surface facing toward the object, in this order from the object.

The negative lens elements in the negative fist lens group are preferably provided with at lest one aspherical surface.

The wide-angle zoom lens system satisfies the following condition:

$$2.9 < f2/fw < 3.8 \quad (4)$$

wherein f2 designates the focal length of the positive second lens group; and fw designates the focal length of the entire wide-angle zoom lens system at the short focal length extremity.

The positive third lens group preferably includes at least two negative lens elements and at least two positive lens elements; and, one of the negative lens elements and one of the positive lens elements are preferably bonded to each other.

Alternatively, the positive third lens group preferably includes a cemented lens having a positive lens element and a negative lens element, a negative lens element, and at least one positive lens element, in this order from the object.

The present disclosure relates to subject matter contained in Japanese Patent Application No. 2009-22627 (filed on Feb. 3, 2009) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show aberrations of the lens arrangement shown in FIG. 1;

FIGS. 3A, 3B and 3C show lateral aberrations of the lens arrangement shown in FIG. 1;

FIGS. 5A, 5B, 5C and 5D show aberrations of the lens arrangement shown in FIG. 4;

FIGS. 6A, 6B and 6C show lateral aberrations of the lens arrangement shown in FIG. 4;

FIGS. 8A, 8B, 8C and 8D show aberrations of the lens arrangement shown in FIG. 7;

FIGS. 9A, 9B and 9C show lateral aberrations of the lens arrangement shown in FIG. 7;

FIGS. 11A, 11B, 11C and 11D show aberrations of the lens arrangement shown in FIG. 10;

FIGS. 12A, 12B and 12C show lateral aberrations of the lens arrangement shown in FIG. 10;

FIGS. 14A, 14B, 14C and 14D show aberrations of the lens arrangement shown in FIG. 13;

FIGS. 15A, 15B and 15C show lateral aberrations of the lens arrangement shown in FIG. 13;

FIGS. 17A, 17B, 17C and 17D show aberrations of the lens arrangement shown in FIG. 16;

FIGS. 18A, 18B and 18C show lateral aberrations of the lens arrangement shown in FIG. 16;

FIGS. 20A, 20B, 20C and 20D show aberrations of the lens arrangement shown in FIG. 19;

FIGS. 21A, 21B and 21C show lateral aberrations of the lens arrangement shown in FIG. 19;

FIGS. 23A, 23B, 23C and 23D show aberrations of the lens arrangement shown in FIG. 22;

FIGS. 24A, 24B and 24C show lateral aberrations of the lens arrangement shown in FIG. 22;

FIGS. 26A, 26B, 26C and 26D show aberrations of the lens arrangement shown in FIG. 25;

FIGS. 27A, 27B and 27C show lateral aberrations of the lens arrangement shown in FIG. 25;

FIGS. 29A, 29B, 29C and 29D show aberrations of the lens arrangement shown in FIG. 28;

FIGS. 30A, 30B and 30C show lateral aberrations of the lens arrangement shown in FIG. 28;

FIGS. 32A, 32B, 32C and 32D show aberrations of the lens arrangement shown in FIG. 31;

FIGS. 33A, 33B and 33C show lateral aberrations of the lens arrangement shown in FIG. 31;

FIGS. 35A, 35B, 35C and 35D show aberrations of the lens arrangement shown in FIG. 34;

FIGS. 36A, 36B and 36C show lateral aberrations of the lens arrangement shown in FIG. 34;

FIGS. 38A, 38B, 38C and 38D show aberrations of the lens arrangement shown in FIG. 37;

FIGS. 39A, 39B and 39C show lateral aberrations of the lens arrangement shown in FIG. 37;

FIGS. 41A, 41B, 41C and 41D show aberrations of the lens arrangement shown in FIG. 40;

FIGS. 42A, 42B and 42C show lateral aberrations of the lens arrangement shown in FIG. 40.

DESCRIPTION OF THE PREFERRED EMBODIMENTS

Figure 43:
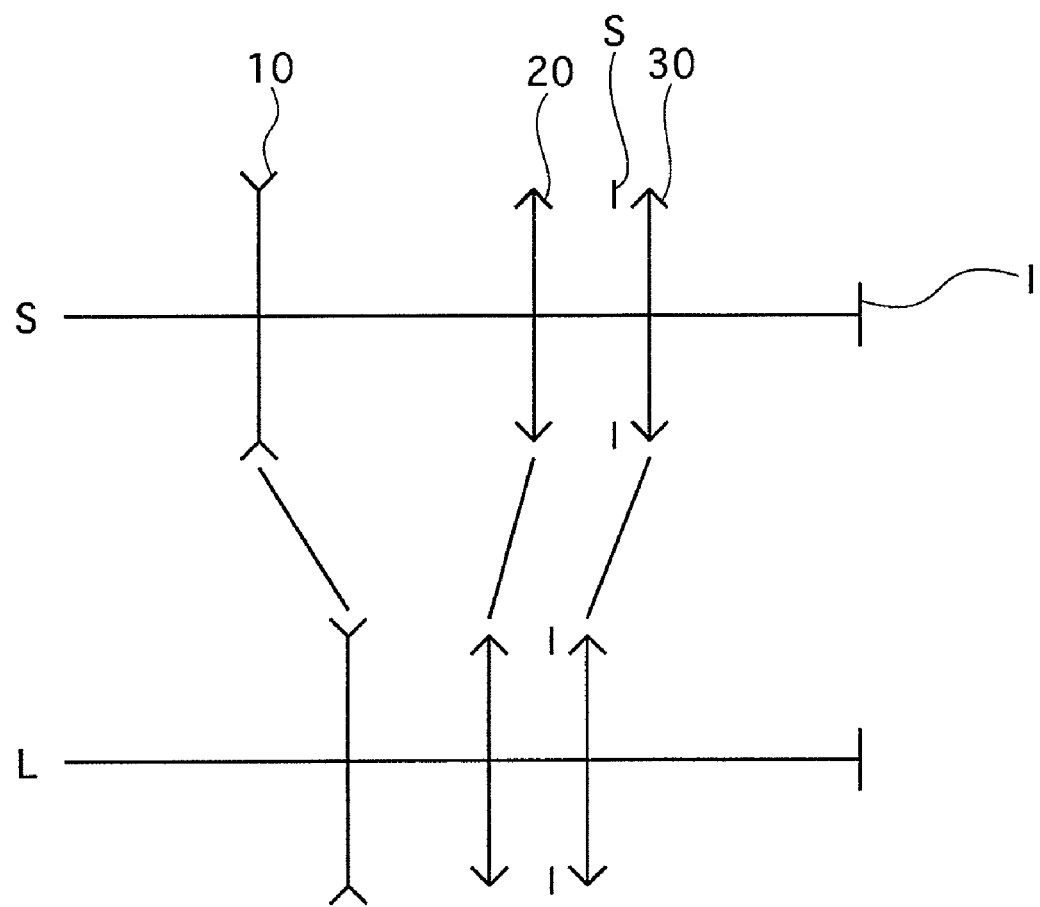
FIG. 43 shows lens-group moving paths of the wide-angle zoom lens system according to the present invention.

The present invention provides a wide-angle zoom lens system, for use in landscape photography, which can achieve an angle-of-view of 70° even at the long focal length extremity (L); and, as shown in the lens-group moving paths illustrated in FIG. 43, the a wide-angle zoom lens system is provided with a negative fist lens group 10, a positive second lens group 20, a diaphragm S, and a positive third lens group 30, in this order from the object.

Upon zooming from the short focal length extremity (S), an intermediate focal length (M) and the long focal length extremity (L), the distance between the negative fist lens group 10 and the positive second lens group 20 decreases, and the distance between the positive second lens group 20 and the positive third lens group 30 also decreases.

More specifically, the negative fist lens group 10 monotonically moves toward the image, and the positive second lens group 20 and the positive third lens group 30 monotonically (but independently) move toward the object.

Focusing is carried out by the positive second lens group 20.

'I' designates the imaging plane.

The lens arrangement and role of each lens group of the wide-angle zoom lens system according to the present invention is generally discussed in the following.

The negative fist lens group 10 is preferably constituted by a plurality of lens elements including at least one positive lens element which is provided to reduce distortion while the first lens group 10 as a whole has a negative refractive power.

Specifically, in the negative fist lens group 10, for the purpose of correcting distortion, it is preferable that the most object-side lens element be constituted by a positive lens element lens element (a convex lens element).

However, when a positive lens element is provided as the most object-side lens element, the maximum diameter of the wide-angle zoom lens system is disadvantageously increased.

In order to overcome the above-explained disadvantage, a negative lens element is provided as the most object-side lens element, and it is preferable that an aspherical surface be formed on at least one of the negative lens elements in the negative fist lens group 10.

The aspherical surface on a negative lens element is preferably formed so that a negative refractive power is made weaker toward the periphery thereof. Due to this optical arrangement, positive distortion can be generated on the aspherical surface, so that negative distortion which is noticeably generated in the negative fist lens group 10 can suitably be corrected.

In addition, from the viewpoint of manufacturing costs, etc., it is preferable that the aspherical surface be a hybrid-type aspherical surface which is formed by bonding a resin aspherical surface layer on a glass lens surface.

The positive second lens group 20, as a focusing lens group, preferably includes at least one positive lens element for correcting residual astigmatism and distortion occurred in the negative fist lens group 10.

Furthermore, aberration fluctuations can be corrected by providing a negative lens element. In this respect, it is desirable to employ a cemented lens which as a whole has a positive refractive power, and is constituted by a positive lens element and a negative lens element in order to more suitably perform the correcting of the astigmatism and distortion.

In the positive third lens group 30, a negative lens element is preferably provided to generate negative spherical aberration in order to correct s spherical aberration occurred in the entire zoom lens system. Further, considering a case where the positive third lens group 30 is arranged to have a strong positive refractive power, it is preferable to provide at least two positive lens elements for the purpose of reducing the occurrence of spherical aberration and coma. Here, it is noted that by bonding a positive lens elements out of the at least two positive lens elements and a negative lens element, spherical aberration of higher order can suitably be corrected.

More specific descriptions on each lens group will be discussed hereinafter.

Figure 1:
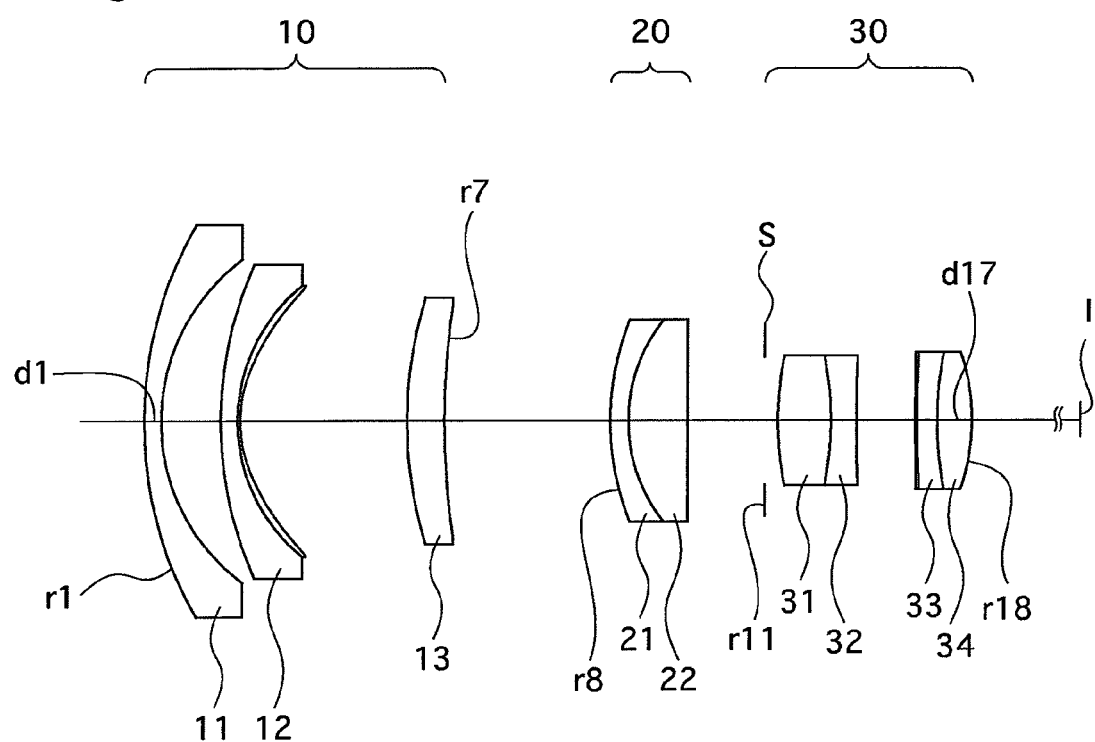
FIG. 1 shows a lens arrangement of a first embodiment of a wide-angle zoom lens system when an object at infinity is in an in-focus state at the short focal length extremity.

As shown in the first through seventh embodiments of FIGS. 1 (4), 7 (10), 13 (16), 19 (22), 25 (28), 31 (34) and 37 (40), the negative fist lens group 10 includes a negative meniscus lens element 11 having the concave surface facing toward the image, a negative meniscus lens element 12 having the concave surface facing toward the image, and a positive meniscus lens element 13 having the convex surface facing toward the object, in this order from the object.

The negative meniscus lens element 12 in the negative fist lens group 10 is formed as a hybrid lens element having a plastic aspherical layer bonded on the image-side surface of the negative meniscus lens element 12 which is made from glass. The aspherical surface can be formed on any one of the negative meniscus lens element 11 and the negative meniscus lens element 12.

Furthermore, the negative fist lens group 10 can be divided into a negative first sub-lens group 1a and a positive second sub-lens group 1b at the largest air-distance therebetween in the negative fist lens group 10.

In each of the first through seventh embodiments, the negative first sub-lens group 1a includes the negative meniscus lens element 11 and the negative meniscus lens element 12, and the positive second sub-lens group 1b includes the positive meniscus lens element 13.

As shown in the embodiments of FIGS. 1 (4), 7 (10), 13 (16), 25 (28) and 31 (34), the positive second lens group 20 includes a cemented lens having a negative meniscus lens element 21 having the concave surface facing toward the image and a biconvex positive lens element 22, in this order from the object.

Figure 19:
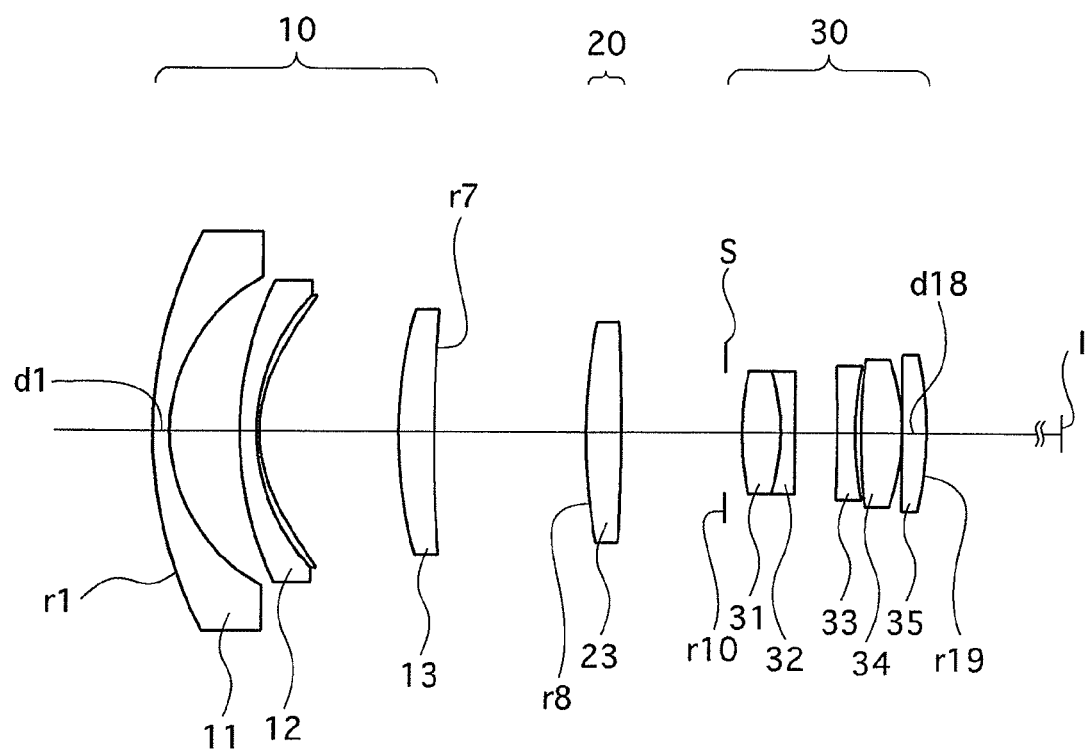
FIG. 19 shows a lens arrangement of a fourth embodiment of a wide-angle zoom lens system when an object at infinity is in an in-focus state at the short focal length extremity.

In the embodiments of FIGS. 19 (22) and 37 (40), the positive second lens group 20 includes a positive single lens element 23.

As shown in the embodiments of FIGS. 1 (4), 7 (10), 13 (16) and 31 (34), the positive third lens group 30 includes a cemented lens having a biconvex positive lens element 31 and a biconcave negative lens element 32, and a cemented lens having a negative meniscus lens element 33 having the concave surface facing toward the image, and a biconvex positive lens element 34, in this order from the object.

Figure 25:
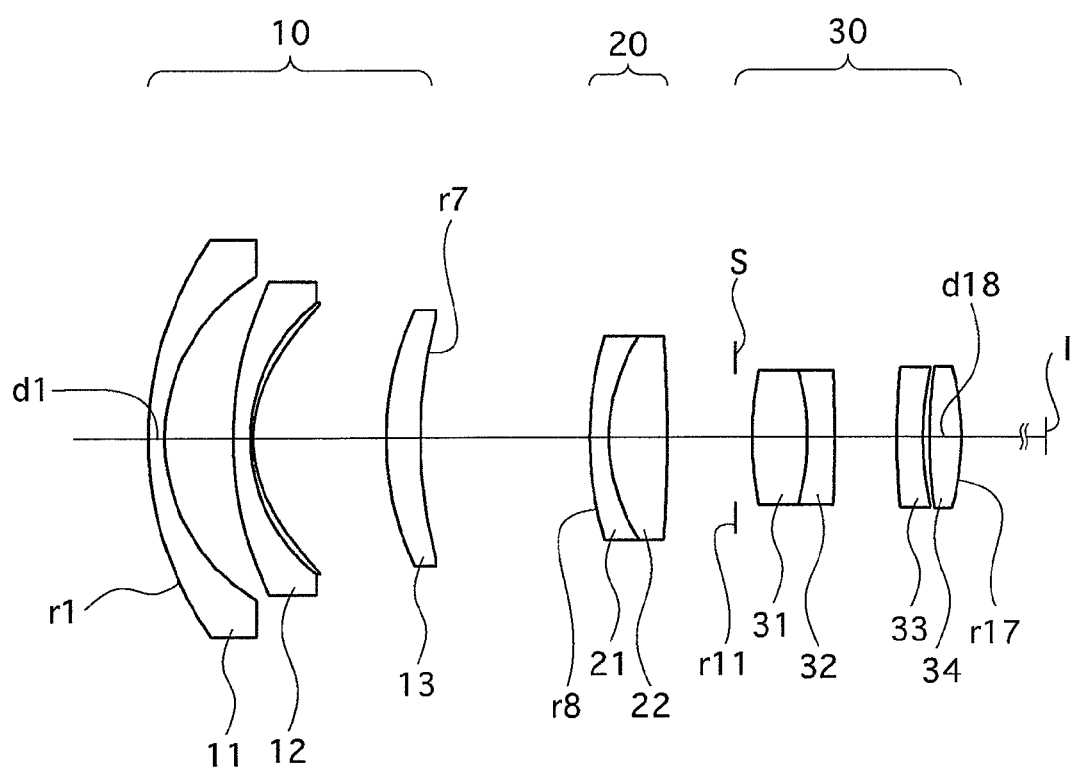
FIG. 25 shows a lens arrangement of a fifth embodiment of a wide-angle zoom lens system when an object at infinity is in an in-focus state at the short focal length extremity.

In the embodiment shown in FIG. 25 (28), the positive third lens group 30 includes a cemented lens having a biconvex lens element 31 and a negative meniscus lens element 32 having the convex surface facing toward the image, a negative meniscus lens element 33 having the concave surface facing toward the image, and a biconvex positive lens element 34, in this order from the object.

In the embodiments of FIGS. 19 (22) and 37 (40), the positive third lens group 30 includes a cemented lens having a biconvex positive lens element 31 and a negative meniscus lens element 32 having the convex surface facing toward the image, a negative single lens element 33, a positive single lens element 34, and a positive single lens element 35, in this order from the object.

In other words, the positive third lens group 30 includes at least two negative lens elements and at least two positive lens elements, and one of the negative lens elements and one of the positive lens elements constitute a cemented lens.

Furthermore, the positive third lens group 30 includes a cemented lens having a positive lens element and a negative lens element, a negative lens element, and at least one positive lens element. The positive and negative lens elements of the cemented lens can be provided in any order.

Condition (1) concerns the refractive power of the positive third lens group 30.

If f3/fw exceeds the lower limit of condition (1), the refractive power of the positive third lens group 30 becomes stronger, so that spherical aberration is undercorrected. Moreover, astigmatic difference toward the periphery of the imaging plane becomes larger.

If f3/fw exceeds the upper limit of condition (1), the refractive power of the positive third lens group 30 becomes weaker. Consequently, positive spherical aberration and coma undesirably occur.

More preferably, the positive third lens group 30 satisfies the following condition:

$$2.45 < f3/fw < 3.2 \quad (1')$$

Condition (2) concerns the balance of the refractive power of the negative fist lens group 10 and the positive second lens group 20.

If f1/f2 exceeds the lower limit of condition (2), the refractive power of the positive second lens group 20 becomes stronger. Consequently, spherical aberration largely occurs, the diameter of the most object-side lens element of the negative fist lens group 10 becomes larger, and the back focal distance cannot sufficiently be secured.

If f1/f2 exceeds the upper limit of condition (2), the refractive power the negative fist lens group 10 becomes stronger. Consequently, field curvature and astigmatism largely occur, so that the correcting of aberrations by the positive second lens group 20 and thereafter becomes difficult.

More preferably, the negative fist lens group 10 and the positive second lens group 20 satisfy the following condition:

$$-0.53 < f1/f2 < -0.38 \quad (2')$$

Condition (3) concerns the balance of the refractive power in the negative fist lens group 10.

If d1a-b/fw exceeds the lower limit of condition (3), the correcting of distortion by the first sub-lens group 1a becomes difficult.

If d1a-b/fw exceeds the upper limit of condition (3), the positive refractive power of the second sub-lens group 1b has to be made stronger, so that the correcting of spherical aberration occurred in the second sub-lens group 1b becomes difficult.

Condition (4) concerns the refractive power of the positive second lens group 20 as a focusing lens group. This condition is to achieve a shorter traveling distance of the positive second lens group 20 upon focusing, and to achieve a shorter minimum photographing distance.

If f2/fw exceeds the lower limit of condition (4), the refractive power of the positive second lens group 20 becomes stronger. Consequently, it is difficult to secure a longer back focal distance, and astigmatic difference becomes larger toward the periphery of the imaging plane.

If f2/fw exceeds the upper limit of condition (4), the refractive power of the positive second lens group 20 becomes weaker. Consequently, the overall length of the wide-angle zoom lens system becomes longer. Moreover, distortion occurred in the negative fist lens group 10 cannot be properly corrected, and hence distortion remains, which undesirably causes an increase in aberration fluctuations at a close (photographing) distance.

Specific numerical data of the embodiments will be described hereinafter. The zoom lens systems of each of the following embodiments are for use in a digital SLR camera.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

In the diagrams of lateral aberration, the solid line and the dotted line respectively indicate spherical aberrations with respect to the d and g lines.

In the tables, R designates the radius of curvature, d designates the lens-element thickness or a distance between lens elements (lens groups), Nd designates the refractive index of the d-line, and vd designates the Abbe number, FNO. designates the F-number, f designates the focal length of the entire lens system, W designates the half angle-of-view (°), y designates the image height, BF designates the back focal distance (the distance between the image-side surface of the most image-side cover glass to the imaging plane), L designates the length of the lens system (the distance from surface No. 1 to the imaging plane).

FNO., f, W, y, BF, L and d (which changes according to focusing) are shown in the following order: "the short focal length extremity, an intermediate focal length, the long focal length extremity".

In addition to the above, an aspherical surface which is symmetrical with respect to the optical axis is defined as follows:

$$x = cy^2/[1+\{1-(1+K)c^2y^2\}^{1/2}] + A4y^4 + A6y^6 + A8y^8 + A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 shows the lens arrangement of the first embodiment of a wide-angle zoom lens system when an object at infinity is in an in-focus state at the short focal length extremity.

FIGS. 2A through 2D show aberrations of the lens arrangement shown in FIG. 1. FIGS. 3A though 3C show lateral aberrations of the lens arrangement shown in FIG. 1.

Figure 4:
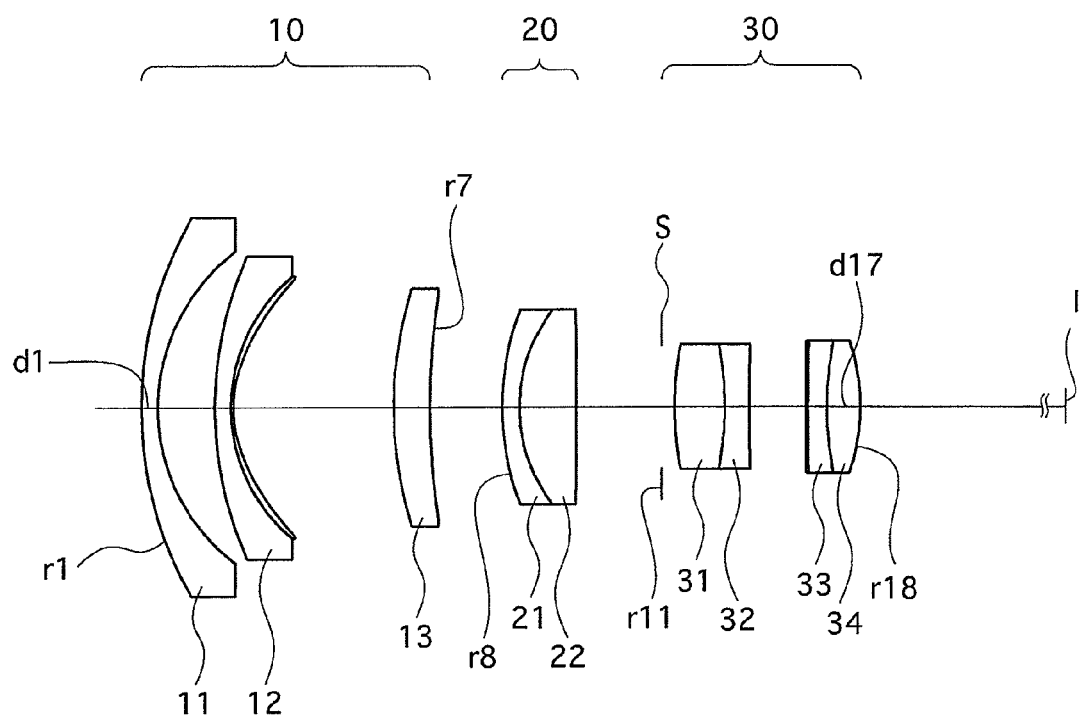
FIG. 4 shows a lens arrangement of the first embodiment of a wide-angle zoom lens system when an object at infinity is in an in-focus state at the long focal length extremity.

FIG. 4 shows the lens arrangement of the first embodiment of a wide-angle zoom lens system when an object at infinity is in an in-focus state at the long focal length extremity.

FIGS. 5A through 5D show aberrations of the lens arrangement shown in FIG. 4. FIGS. 6A through 6C show lateral aberrations of the lens arrangement shown in FIG. 4.

Table 1 shows the numerical data of the first embodiment.

The negative first lens group 10 (surface Nos. 1 through 7) includes a negative meniscus lens element 11 having the concave surface facing toward the image, a negative meniscus lens element 12 having the concave surface facing toward the image, and a positive meniscus lens element 13 having the convex surface facing toward the object, in this order from the object. The negative meniscus lens element 12, in the negative first lens group 10, is made from glass, and is formed as a hybrid lens element in which a plastic aspherical layer is bonded on the image-side (glass) surface of the negative meniscus lens element 12.

The positive second lens group 20 (surface Nos. 8 through 10) includes a cemented lens having a negative meniscus lens element 21 having the concave surface facing toward the image and a biconvex positive lens element 22, in this order from the object.

The positive third lens group 30 (surface Nos. 12 through 18) includes a cemented lens having a biconvex positive lens element 31 and a biconcave negative lens element 32, and a cemented lens having a negative meniscus lens element 33 having the concave surface facing toward the image, and a biconvex positive lens element 34, in this order from the object. The negative meniscus lens element 33 having the concave surface facing toward the image, in the positive third lens group 30, is made from glass, and is formed as a hybrid lens element in which a plastic aspherical layer is bonded on the object-side (glass) surface of the negative meniscus lens element 33.

TABLE 1

FNO. = 1:4.0-4.1-4.3
f = 16.50-18.20-20.01 (Zoom Ratio = 1.21)
W = 40.8-38.1-35.5
Y = 14.24-14.24-14.24
BF = 37.78-40.14-42.68
L = 107.72-106.54-106.05
D7 = 13.987-9.961-6.373
D10 = 6.486-6.980-7.535

| Surf. No. | r | d | Nd | ν |
|---|---|---|---|---|
| 1 | 33.449 | 1.455 | 1.77250 | 49.6 |
| 2 | 17.193 | 4.984 | | |
| 3 | 32.577 | 1.423 | 1.80400 | 46.6 |
| 4 | 14.924 | 0.224 | 1.52972 | 42.7 |
| 5* | 11.296 | 14.085 | | |
| 6 | 35.539 | 3.192 | 1.80518 | 25.4 |
| 7 | 66.688 | D7 | | |
| 8 | 23.543 | 1.516 | 1.80400 | 46.6 |
| 9 | 14.014 | 4.977 | 1.58144 | 40.7 |
| 10 | −2510.419 | D10 | | |
| 11 (Diaphragm) | ∞ | 1.160 | | |
| 12 | 28.475 | 4.486 | 1.49700 | 81.6 |
| 13 | −28.475 | 2.155 | 1.80610 | 40.9 |
| 14 | 171.058 | 5.000 | | |
| 15* | 182.011 | 0.200 | 1.52972 | 42.7 |
| 16 | 188.635 | 1.675 | 1.80518 | 25.4 |
| 17 | 30.064 | 2.932 | 1.48749 | 70.2 |
| 18 | −18.025 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | −0.4389 × 10$^{-5}$ | −0.3818 × 10$^{-7}$ | −0.4000 × 10$^{-9}$ |
| 15 | 0.000 | −0.3922 × 10$^{-4}$ | | |

Zoom-Lens-Group Data

| Lens Group | First Surface | Focal Length |
|---|---|---|
| 1 | 1 | −22.65 |
| 2 | 8 | 52.81 |
| 3 | 12 | 45.30 |

Lens Data at Finite Focal Lengths

| | | Infinity | Intermediate Distance | Minimum Distance |
|---|---|---|---|---|
| (S) | Magnification | 0 | −0.02 | −0.14 |
| Short Focal-Length Extremity | BF | 37.78 | | |
| | D7 | 13.987 | 14.619 | 18.453 |
| | D10 | 6.486 | 5.853 | 2.019 |
| (M) | Magnification | 0 | −0.02 | −0.154 |
| Intermediate Focal-Length | BF | 40.14 | | |
| | D7 | 9.961 | 10.534 | 14.325 |
| | D10 | 6.98 | 6.407 | 2.616 |
| (L) | Magnification | 0 | −0.02 | −0.169 |
| Long Focal-Length Extremity | BF | 42.68 | | |
| | D7 | 6.373 | 6.886 | 10.711 |
| | D10 | 7.535 | 7.022 | 3.197 |

Embodiment 2

Figure 7:
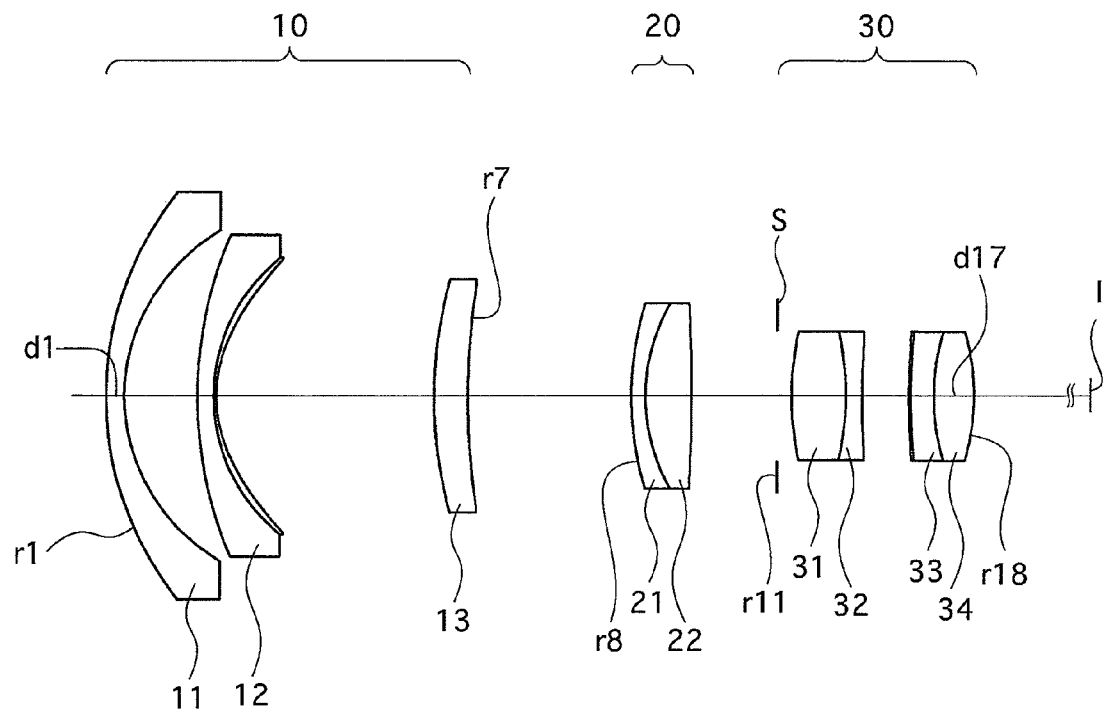
FIG. 7 shows a lens arrangement of a second embodiment of a wide-angle zoom lens system when an object at infinity is in an in-focus state at the short focal length extremity.

FIG. 7 shows the lens arrangement of the second embodiment of a wide-angle zoom lens system when an object at infinity is in an in-focus state at the short focal length extremity. FIGS. 8A through 8D show aberrations of the lens arrangement shown in FIG. 7. FIGS. 9A through 9C show lateral aberrations of the lens arrangement shown in FIG. 7.

Figure 10:
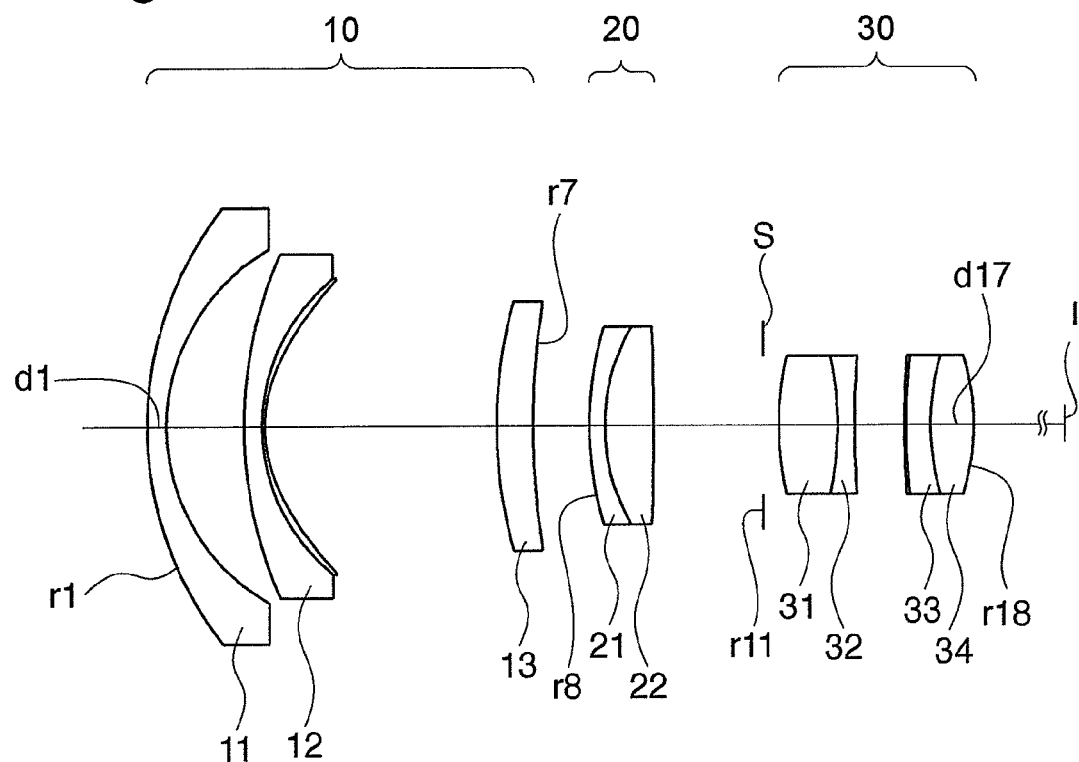
FIG. 10 shows a lens arrangement of the second embodiment of a wide-angle zoom lens system when an object at infinity is in an in-focus state at the long focal length extremity.

FIG. 10 shows the lens arrangement of the second embodiment of a wide-angle zoom lens system when an object at infinity is in an in-focus state at the long focal length extremity. FIGS. 11A through 11D show aberrations of the lens arrangement shown in FIG. 10. FIGS. 12A through 12C show lateral aberrations of the lens arrangement shown in FIG. 10.

Table 2 shows the numerical data of the second embodiment.

The basic lens arrangement of the second embodiment is the same as that of the first embodiment.

TABLE 2

FNO. = 1:3.9-4.1-4.3
f = 16.01-18.00-20.05 (Zoom Ratio = 1.25)
W = 41.7-38.4-35.4
Y = 14.24-14.24-14.24
BF = 38.94-41.74-44.67
L = 116.94-115.12-114.32
D7 = 14.576-9.219-4.751
D10 = 7.769-8.512-9.254

TABLE 2-continued

| Surf. No. | r | d | Nd | ν |
|---|---|---|---|---|
| 1 | 29.459 | 1.600 | 1.77250 | 49.6 |
| 2 | 17.093 | 6.500 | | |
| 3 | 36.085 | 1.480 | 1.80400 | 46.6 |
| 4 | 15.898 | 0.240 | 1.52972 | 42.7 |
| 5* | 12.050 | 19.520 | | |
| 6 | 39.688 | 3.020 | 1.80518 | 25.4 |
| 7 | 64.938 | D7 | | |
| 8 | 28.090 | 1.300 | 1.80400 | 46.6 |
| 9 | 16.614 | 4.120 | 1.58144 | 40.7 |
| 10 | −221.111 | D10 | | |
| 11 (Diaphragm) | ∞ | 1.330 | | |
| 12 | 26.525 | 4.960 | 1.49700 | 81.6 |
| 13 | −26.525 | 1.470 | 1.74100 | 52.7 |
| 14 | 79.199 | 4.240 | | |
| 15* | 79.160 | 0.200 | 1.52972 | 42.7 |
| 16 | 62.742 | 2.020 | 1.80518 | 25.4 |
| 17 | 19.896 | 3.650 | 1.48749 | 70.2 |
| 18 | −19.896 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | $-0.2418 \times 10^{-5}$ | $-0.1166 \times 10^{-7}$ | $-0.4000 \times 10^{-9}$ |
| 15 | 0.000 | $-0.2261 \times 10^{-4}$ | | |

Zoom-Lens-Group Data

| Lens Group | First Surface | Focal Length |
|---|---|---|
| 1 | 1 | −23.45 |
| 2 | 8 | 55.64 |
| 3 | 12 | 51.08 |

Lens Data at Finite Photographing Distance

| | | Infinity | Intermediate Distance | Minimum Distance |
|---|---|---|---|---|
| (S) | Magnification | 0 | −0.02 | −0.143 |
| Short Focal-Length Extremity | BF | 38.94 | | |
| | D7 | 14.576 | 15.303 | 19.881 |
| | D10 | 7.769 | 7.042 | 2.464 |
| (M) | Magnification | 0 | −0.02 | −0.16 |
| Intermediate Focal-Length | BF | 41.74 | | |
| | D7 | 9.219 | 9.841 | 14.251 |
| | D10 | 8.512 | 7.89 | 3.48 |
| (L) | Magnification | 0 | −0.02 | −0.178 |
| Long Focal-Length Extremity | BF | 44.67 | | |
| | D7 | 4.751 | 5.302 | 9.675 |
| | D10 | 9.254 | 8.704 | 4.331 |

Embodiment 3

Figure 13:
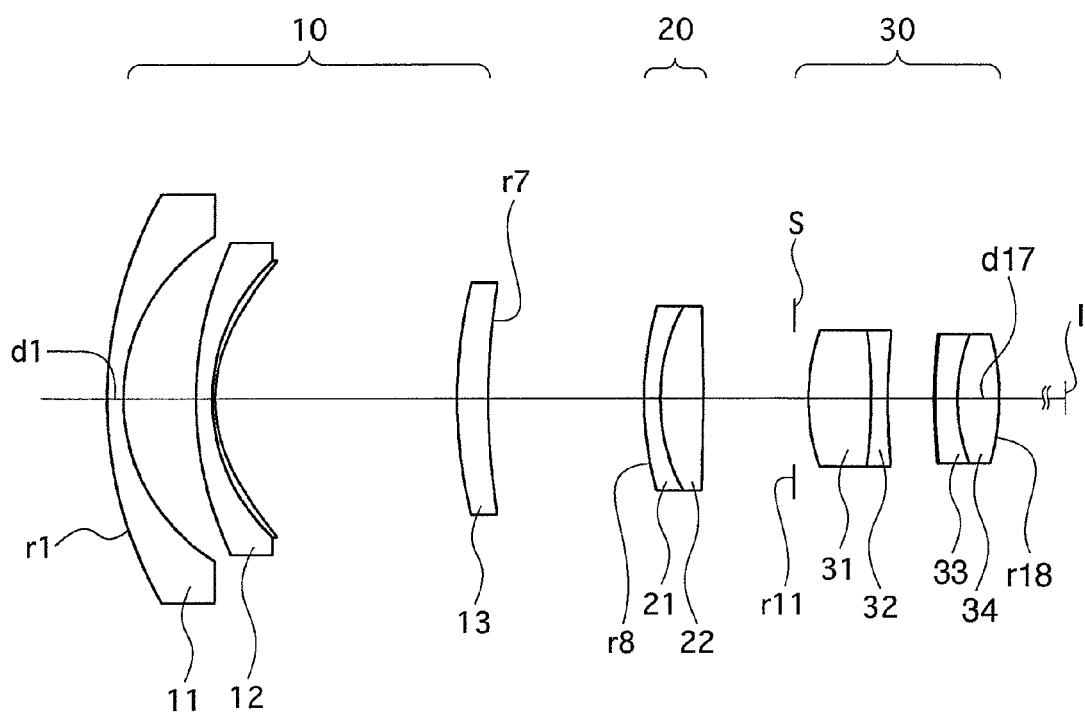
FIG. 13 shows a lens arrangement of a third embodiment of a wide-angle zoom lens system when an object at infinity is in an in-focus state at the short focal length extremity.
Figure 16:
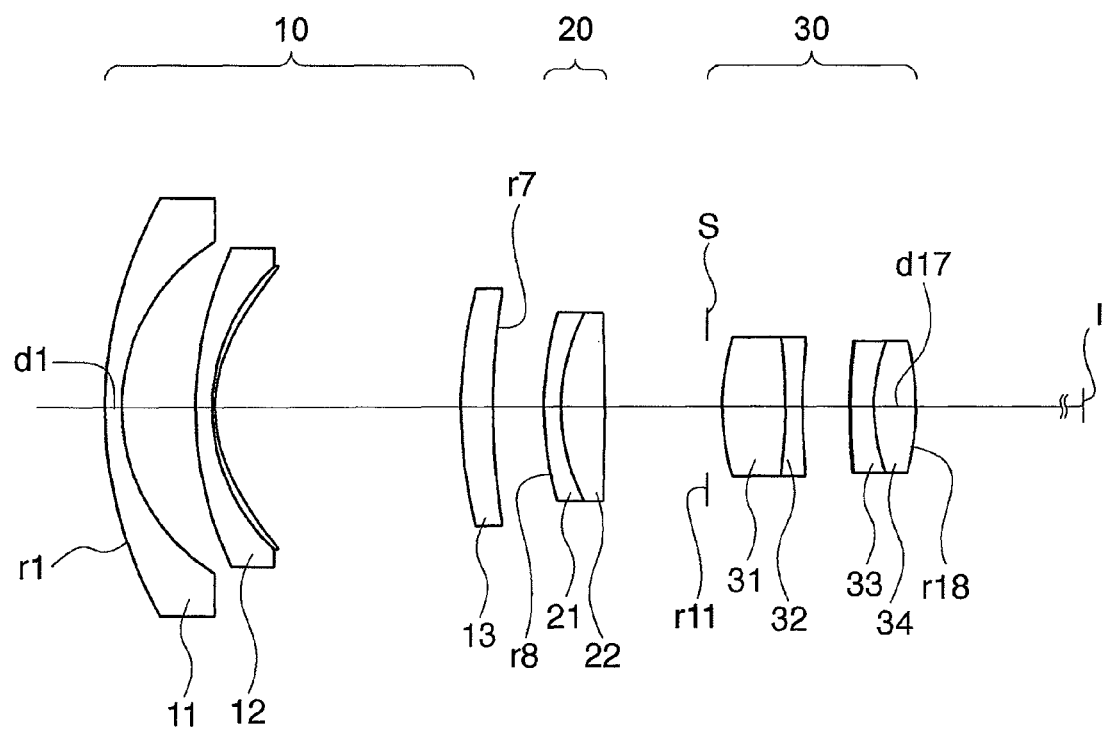
FIG. 16 shows a lens arrangement of the third embodiment of a wide-angle zoom lens system when an object at infinity is in an in-focus state at the long focal length extremity.

FIG. 13 shows the lens arrangement of the third embodiment of a wide-angle zoom lens system when an object at infinity is in an in-focus state at the short focal length extremity. FIGS. 14A through 14D show aberrations of the lens arrangement shown in FIG. 13. FIGS. 15A through 15C show lateral aberrations of the lens arrangement shown in FIG. 13. FIG. 16 shows the lens arrangement of the third embodiment of a wide-angle zoom lens system when an object at infinity is in an in-focus state at the long focal length extremity. FIGS. 17A through 17D show aberrations of the lens arrangement shown in FIG. 16. FIGS. 18A through 18C show lateral aberrations of the lens arrangement shown in FIG. 16.

Table 3 shows the numerical data of the third embodiment.

The basic lens arrangement of the third embodiment is the same as that of the first embodiment.

TABLE 3

FNO. = 1:3.9-4.1-4.3
f = 16.20-18.01-20.02 (Zoom Ratio = 1.24)
W = 41.4-38.4-35.5
Y = 14.24-14.24-14.24
BF = 37.64-40.13-42.93
L = 118.05-115.95-114.57
D7 = 14.120-9.075-4.500
D10 = 8.200-8.656-9.055

| Surf. No. | r | d | Nd | ν |
|---|---|---|---|---|
| 1 | 36.900 | 1.450 | 1.69680 | 55.5 |
| 2 | 17.093 | 6.480 | | |
| 3 | 32.580 | 1.460 | 1.77250 | 49.6 |
| 4 | 16.900 | 0.240 | 1.52972 | 42.7 |
| 5* | 12.790 | 21.740 | | |
| 6 | 41.300 | 2.850 | 1.80518 | 25.5 |
| 7 | 63.450 | D7 | | |
| 8 | 30.339 | 1.470 | 1.80420 | 46.5 |
| 9 | 17.593 | 3.890 | 1.58144 | 40.9 |
| 10 | −254.587 | D10 | | |
| 11 (Diaphragm) | ∞ | 1.330 | | |
| 12 | 20.131 | 5.630 | 1.49700 | 81.6 |
| 13 | −46.161 | 1.500 | 1.80450 | 39.6 |
| 14 | 54.850 | 4.200 | | |
| 15* | 56.536 | 0.120 | 1.52972 | 42.7 |
| 16 | 54.665 | 2.020 | 1.80610 | 33.3 |
| 17 | 16.161 | 3.710 | 1.48749 | 70.4 |
| 18 | −22.737 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | $-0.1274 \times 10^{-5}$ | $-0.4179 \times 10^{-7}$ | $-0.2750 \times 10^{-9}$ |
| 15 | 0.000 | $-0.2192 \times 10^{-4}$ | | |

Zoom-Lens-Group Data

| Lens Group | First Surface | Focal Length |
|---|---|---|
| 1 | 1 | −24.28 |
| 2 | 8 | 61.45 |
| 3 | 12 | 51.35 |

Lens Data at Finite Photographing Distance

|  |  | Infinity | Intermediate Distance | Minimum Distance |
|---|---|---|---|---|
| (S) | Magnification | 0 | −0.02 | −0.147 |
| Short Focal-Length Extremity | BF | 37.64 | | |
| | D7 | 14.12 | 14.87 | 19.724 |
| | D10 | 8.2 | 7.45 | 2.596 |
| (M) | Magnification | 0 | −0.02 | −0.162 |
| Intermediate Focal-Length | BF | 40.13 | | |
| | D7 | 9.075 | 9.735 | 14.457 |
| | D10 | 8.656 | 7.996 | 3.274 |
| (L) | Magnification | 0 | −0.02 | −0.179 |
| Long Focal-Length Extremity | BF | 42.93 | | |
| | D7 | 4.5 | 5.089 | 9.779 |
| | D10 | 9.055 | 8.466 | 3.776 |

Embodiment 4

FIG. 19 shows the lens arrangement of the fourth embodiment of a wide-angle zoom lens system when an object at infinity is in an in-focus state at the short focal length extremity. FIGS. 20A through 20D show aberrations of the lens arrangement shown in FIG. 19. FIGS. 21A through 21C show lateral aberrations of the lens arrangement shown in FIG. 19.

Figure 22:
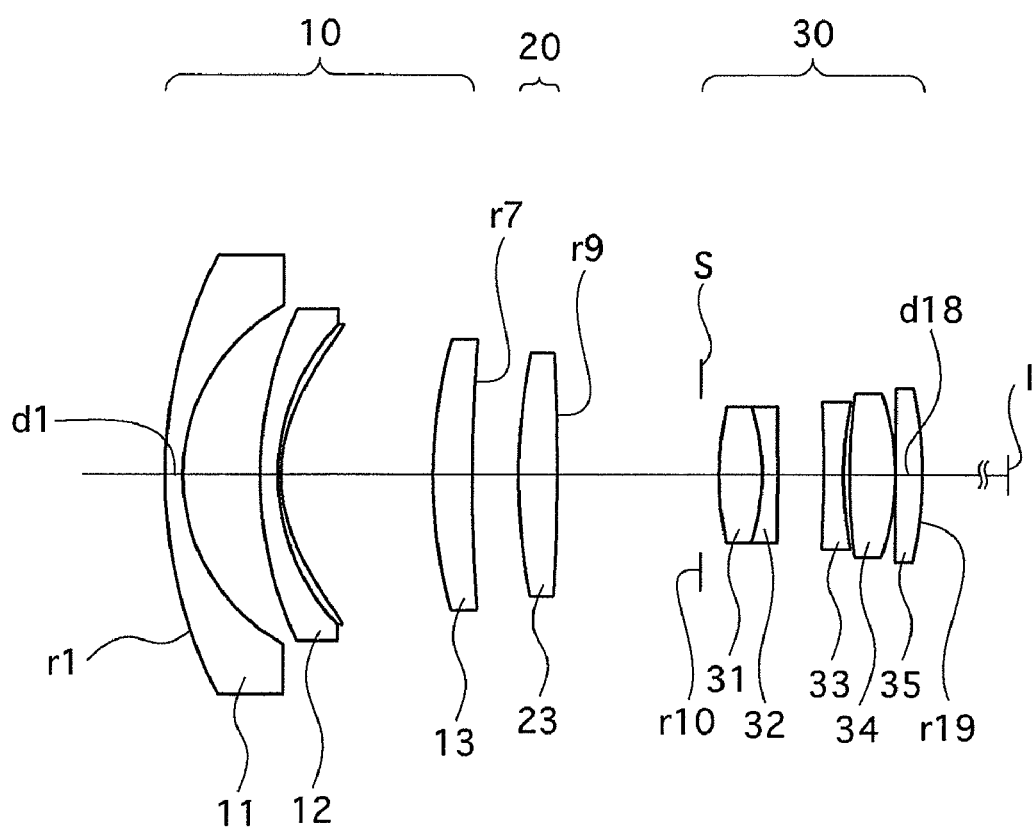
FIG. 22 shows a lens arrangement of the fourth embodiment of a wide-angle zoom lens system when an object at infinity is in an in-focus state at the long focal length extremity.

FIG. 22 shows the lens arrangement of the fourth embodiment of a wide-angle zoom lens system when an object at infinity is in an in-focus state at the long focal length extremity. FIGS. 23A through 23D show aberrations of the lens arrangement shown in FIG. 22. FIGS. 24A through 24C show lateral aberrations of the lens arrangement shown in FIG. 22.

Table 4 shows the numerical data of the fourth embodiment.

The basic lens arrangement of the fourth embodiment is the same as that of the first embodiment except that the positive second lens group 20 (surface Nos. 8 and 9) includes a single positive lens element 23, and the positive third lens group 30 (surface Nos. 12 through 19) includes a cemented lens having a positive lens element 31 and a negative lens element 32, a single negative lens element 33, a single positive lens element 34, and a single positive lens element 35, in this order from the object.

Furthermore, no aspherical surface is provided in the positive third lens group 30.

TABLE 4

FNO. = 1:4.0-4.1-4.3
f = 16.27-17.99-20.06 (Zoom Ratio = 1.23)
W = 41.2-38.4-35.4
Y = 14.24-14.24-14.24
BF = 37.31-39.37-41.93
L = 101.54-100.06-99.08
D7 = 12.731-8.112-3.471
D9 = 8.639-9.725-10.834

| Surf. No. | r | d | Nd | ν |
|---|---|---|---|---|
| 1 | 35.758 | 1.347 | 1.69680 | 55.5 |
| 2 | 14.485 | 5.773 | | |
| 3 | 28.719 | 1.381 | 1.80420 | 46.5 |
| 4 | 16.255 | 0.224 | 1.52972 | 42.7 |
| 5* | 11.700 | 11.526 | | |
| 6 | 38.471 | 2.940 | 1.80518 | 25.5 |
| 7 | 128.668 | D7 | | |
| 8 | 46.545 | 2.926 | 1.70154 | 41.2 |
| 9 | −181.784 | D9 | | |
| 10 (Diaphragm) | ∞ | 1.360 | | |
| 11 | 25.119 | 3.202 | 1.49700 | 81.6 |
| 12 | −16.746 | 1.200 | 1.80420 | 46.5 |
| 13 | −648.376 | 3.500 | | |
| 14 | −127.802 | 1.500 | 1.80610 | 33.3 |
| 15 | 27.885 | 0.489 | | |
| 16 | 49.883 | 3.442 | 1.48749 | 70.4 |
| 17 | −18.144 | 0.000 | | |
| 18 | 876.856 | 2.042 | 1.48749 | 70.4 |
| 19 | −29.727 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | −0.1572 × 10$^{-4}$ | −0.8866 × 10$^{-7}$ | −0.7099 × 10$^{-9}$ |

Zoom-Lens-Group Data

| Lens Group | First Surface | Focal Length |
|---|---|---|
| 1 | 1 | −25.59 |
| 2 | 8 | 53.10 |
| 3 | 11 | 42.52 |

Lens Data at Finite Photographing Distance

|  |  | Infinity | Intermediate Distance | Minimum Distance |
|---|---|---|---|---|
| (S) | Magnification | 0 | −0.02 | −0.129 |
| Short Focal-Length Extremity | BF | 37.31 | | |
| | D7 | 12.731 | 13.568 | 18.224 |
| | D9 | 8.639 | 7.801 | 3.145 |
| (M) | Magnification | 0 | −0.02 | −0.142 |
| Intermediate Focal-Length | BF | 39.37 | | |
| | D7 | 8.112 | 8.849 | 13.397 |
| | D9 | 9.725 | 8.988 | 4.44 |
| (L) | Magnification | 0 | −0.02 | −0.159 |
| Long Focal-Length Extremity | BF | 41.93 | | |
| | D7 | 3.471 | 4.116 | 8.66 |
| | D9 | 10.834 | 10.189 | 5.646 |

Embodiment 5

FIG. 25 shows the lens arrangement of the fifth embodiment of a wide-angle zoom lens system when an object at infinity is in an in-focus state at the short focal length extremity. FIGS. 26A through 26D show aberrations of the lens arrangement shown in FIG. 25. FIGS. 27A through 27C show lateral aberrations of the lens arrangement shown in FIG. 25.

Figure 28:
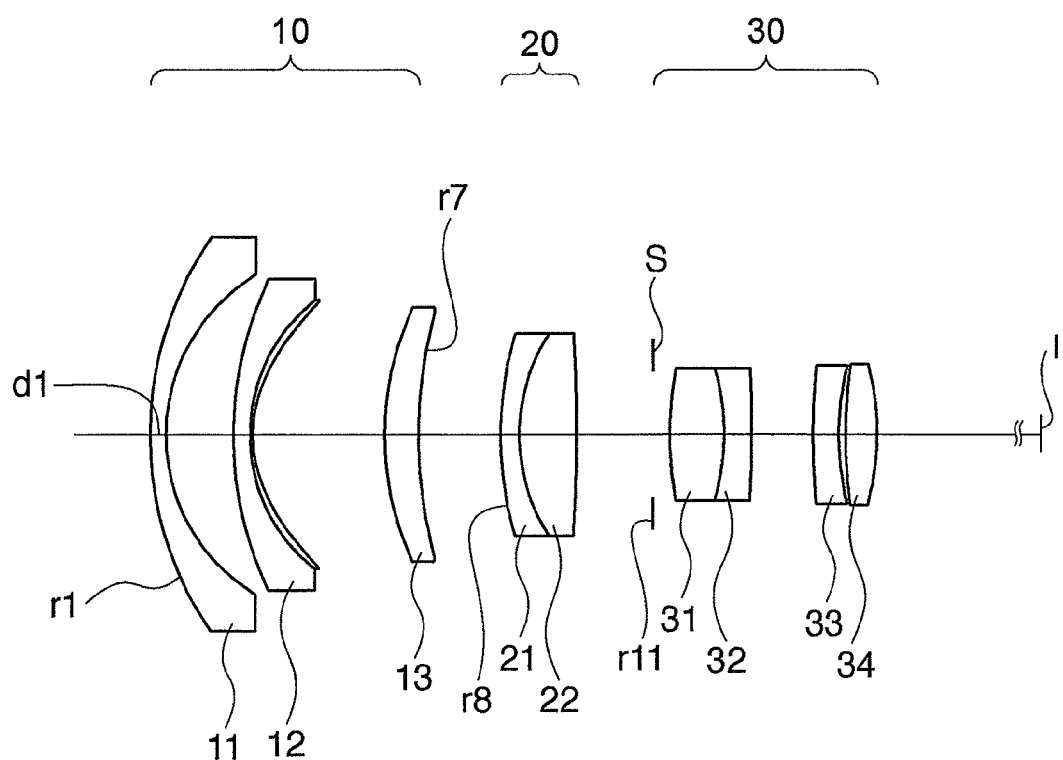
FIG. 28 shows a lens arrangement of the fifth embodiment of a wide-angle zoom lens system when an object at infinity is in an in-focus state at the long focal length extremity.

FIG. 28 shows the lens arrangement of the fifth embodiment of a wide-angle zoom lens system when an object at infinity is in an in-focus state at the long focal length extremity. FIGS. 29A through 29D show aberrations of the lens arrangement shown in FIG. 28. FIGS. 30A through 30C show lateral aberrations of the lens arrangement shown in FIG. 28.

Table 5 shows the numerical data of the fifth embodiment.

The basic lens arrangement of the fifth embodiment is the same as that of the first embodiment except for the following:

the lens element 32 of the positive third lens group 30 includes a negative meniscus lens element having the convex surface facing toward the image;

the negative meniscus lens element 33 and the biconvex positive lens element 34 are not bonded to each other;

the negative meniscus lens element 33 is not provided with an aspherical surface; and the image-side surface of the biconvex positive lens element 34 is provided with an aspherical surface.

TABLE 5

FNO. = 1:4.0-4.1-4.3
f = 16.50-18.00-20.00 (Zoom Ratio = 1.21)
W = 40.8-38.3-35.5
Y = 14.24-14.24-14.24
BF = 37.17-39.18-41.90
L = 103.89-102.75-102.07
D7 = 14.023-10.609-6.809
D10 = 5.616-5.884-6.291

| Surf. No. | r | d | Nd | ν |
|---|---|---|---|---|
| 1 | 28.402 | 1.337 | 1.77250 | 49.6 |
| 2 | 15.482 | 5.544 | | |
| 3 | 29.120 | 1.407 | 1.80400 | 46.6 |
| 4 | 14.115 | 0.224 | 1.52972 | 42.7 |
| 5* | 10.670 | 10.954 | | |
| 6 | 24.855 | 2.806 | 1.84666 | 23.8 |
| 7 | 38.900 | D7 | | |
| 8 | 30.024 | 1.548 | 1.76067 | 50.4 |
| 9 | 15.607 | 4.691 | 1.56728 | 42.7 |
| 10 | −121.552 | D10 | | |
| 11 (Diaphragm) | ∞ | 1.360 | | |
| 12 | 29.821 | 4.497 | 1.49700 | 81.6 |
| 13 | −19.829 | 2.234 | 1.80610 | 40.9 |
| 14 | −176.560 | 5.146 | | |
| 15 | 62.596 | 2.171 | 1.84666 | 23.8 |
| 16 | 24.664 | 0.554 | | |
| 17 | 42.425 | 2.604 | 1.58636 | 60.9 |
| 18* | −21.710 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | $0.3373 \times 10^{-5}$ | $-0.2414 \times 10^{-7}$ | $-0.9047 \times 10^{-9}$ |
| 18 | 0.000 | $0.1015 \times 10^{-4}$ | | |

Zoom-Lens-Group Data

| Lens Group | First Surface | Focal Length |
|---|---|---|
| 1 | 1 | −22.43 |
| 2 | 8 | 56.82 |
| 3 | 12 | 40.58 |

Lens Data at Finite Photographing Distance

| | | Infinity | Intermediate Distance | Minimum Distance |
|---|---|---|---|---|
| (S) Short Focal-Length Extremity | Magnification | 0 | −0.02 | −0.137 |
| | BF | 37.17 | | |
| | D7 | 14.023 | 14.633 | 18.186 |
| | D10 | 5.616 | 5.006 | 1.453 |

-continued

Lens Data at Finite Photographing Distance

| | | Infinity | Intermediate Distance | Minimum Distance |
|---|---|---|---|---|
| (M) Intermediate Focal-Length | Magnification | 0 | −0.02 | −0.148 |
| | BF | 39.18 | | |
| | D7 | 10.609 | 11.159 | 14.759 |
| | D10 | 5.884 | 5.334 | 1.734 |
| (L) Long Focal-Length Extremity | Magnification | 0 | −0.02 | −0.165 |
| | BF | 41.9 | | |
| | D7 | 6.809 | 7.312 | 11 |
| | D10 | 6.291 | 5.788 | 2.1 |

Embodiment 6

Figure 31:
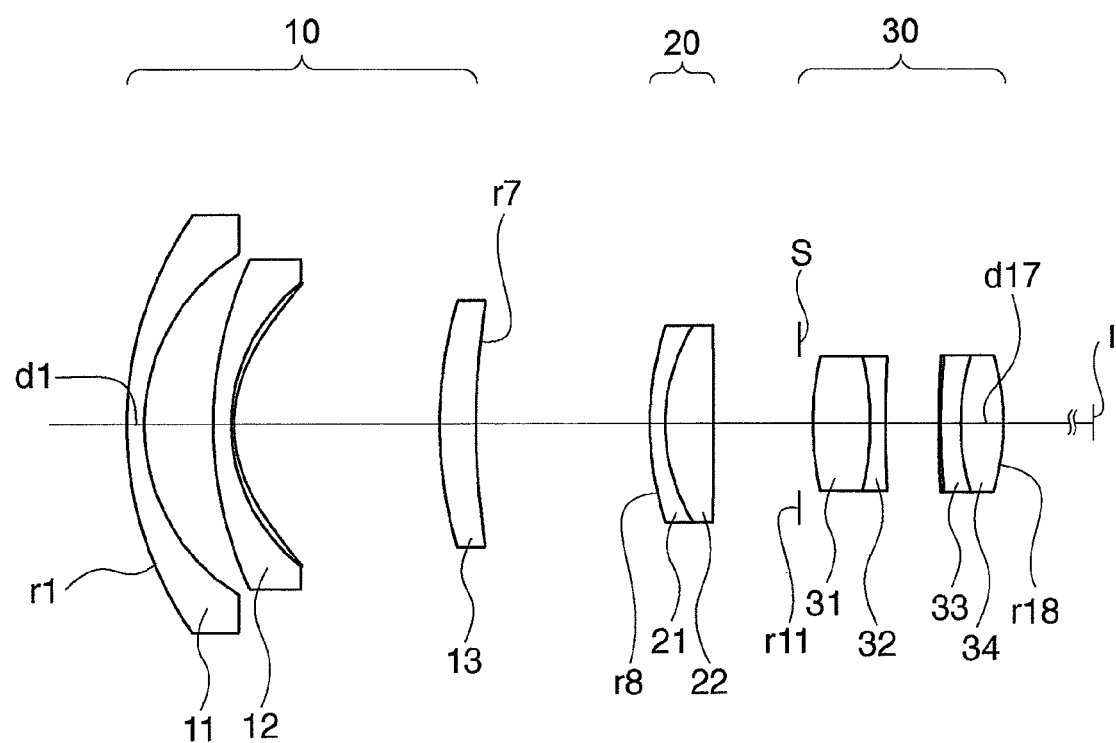
FIG. 31 shows a lens arrangement of a sixth embodiment of a wide-angle zoom lens system when an object at infinity is in an in-focus state at the short focal length extremity.

FIG. 31 shows the lens arrangement of the sixth embodiment of a wide-angle zoom lens system when an object at infinity is in an in-focus state at the short focal length extremity. FIGS. 32A through 32D show aberrations of the lens arrangement shown in FIG. 31. FIGS. 33A through 33C show lateral aberrations of the lens arrangement shown in FIG. 31.

Figure 34:
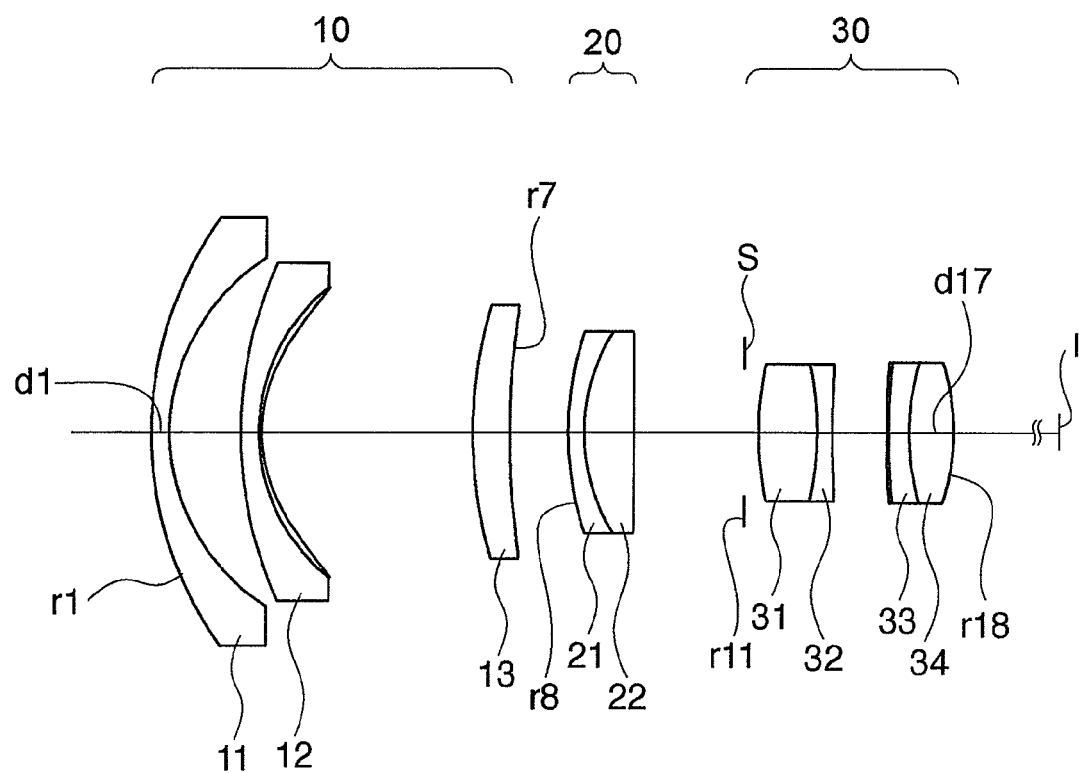
FIG. 34 shows a lens arrangement of the sixth embodiment of a wide-angle zoom lens system when an object at infinity is in an in-focus state at the long focal length extremity.

FIG. 34 shows the lens arrangement of the sixth embodiment of a wide-angle zoom lens system when an object at infinity is in an in-focus state at the long focal length extremity. FIGS. 35A through 35D show aberrations of the lens arrangement shown in FIG. 34. FIGS. 36A through 36C show lateral aberrations of the lens arrangement shown in FIG. 34.

Table 6 shows the numerical data of the sixth embodiment.

The basic lens arrangement of the sixth embodiment is the same as that of the first embodiment.

TABLE 6

FNO. = 1:3.9-4.1-4.3
f = 16.00-18.00-20.05 (Zoom Ratio = 1.25)
W = 41.7-38.4-35.4
Y = 14.24-14.24-14.24
BF = 38.74-41.48-44.37
L = 113.28-111.58-110.85
D7 = 14.740-9.343-4.816
D10 = 7.334-8.291-9.204

| Surf. No. | r | d | Nd | ν |
|---|---|---|---|---|
| 1 | 30.430 | 1.481 | 1.77250 | 49.6 |
| 2 | 16.858 | 5.926 | | |
| 3 | 33.236 | 1.505 | 1.80400 | 46.6 |
| 4 | 15.170 | 0.224 | 1.52972 | 42.7 |
| 5* | 11.663 | 17.528 | | |
| 6 | 37.723 | 3.037 | 1.80518 | 25.4 |
| 7 | 67.401 | D7 | | |
| 8 | 26.739 | 1.300 | 1.80400 | 46.6 |
| 9 | 15.883 | 4.105 | 1.58144 | 40.7 |
| 10 | −1104.964 | D10 | | |
| 11 (Diaphragm) | ∞ | 1.160 | | |
| 12 | 25.887 | 4.892 | 1.49700 | 81.6 |
| 13 | −25.887 | 1.273 | 1.74100 | 52.7 |
| 14 | 86.911 | 4.500 | | |
| 15* | 71.598 | 0.200 | 1.52972 | 42.7 |
| 16 | 60.214 | 1.682 | 1.80518 | 25.4 |
| 17 | 19.802 | 3.655 | 1.48749 | 70.2 |
| 18 | −19.802 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | $-0.2641 \times 10^{-5}$ | $-0.3870 \times 10^{-7}$ | $-0.4000 \times 10^{-9}$ |
| 15 | 0.000 | $-0.2470 \times 10^{-4}$ | | |

Zoom-Lens-Group Data

| Lens Group | First Surface | Focal Length |
|---|---|---|
| 1 | 1 | −23.80 |
| 2 | 8 | 59.34 |
| 3 | 12 | 47.04 |

Lens Data at Finite Photographing Distance

| | | Infinity | Intermediate Distance | Minimum Distance |
|---|---|---|---|---|
| (S) Short Focal-Length Extremity | Magnification | 0 | −0.02 | −0.141 |
| | BF | 38.74 | | |
| | D7 | 14.74 | 15.46 | 19.859 |
| | D10 | 7.334 | 6.614 | 2.215 |
| (M) Intermediate Focal-Length | Magnification | 0 | −0.02 | −0.157 |
| | BF | 41.48 | | |
| | D7 | 9.343 | 9.973 | 14.312 |
| | D10 | 8.291 | 7.66 | 3.322 |
| (L) Long Focal-Length Extremity | Magnification | 0 | −0.02 | −0.175 |
| | BF | 44.37 | | |
| | D7 | 4.816 | 5.382 | 9.756 |
| | D10 | 9.204 | 8.638 | 4.263 |

Embodiment 7

Figure 37:
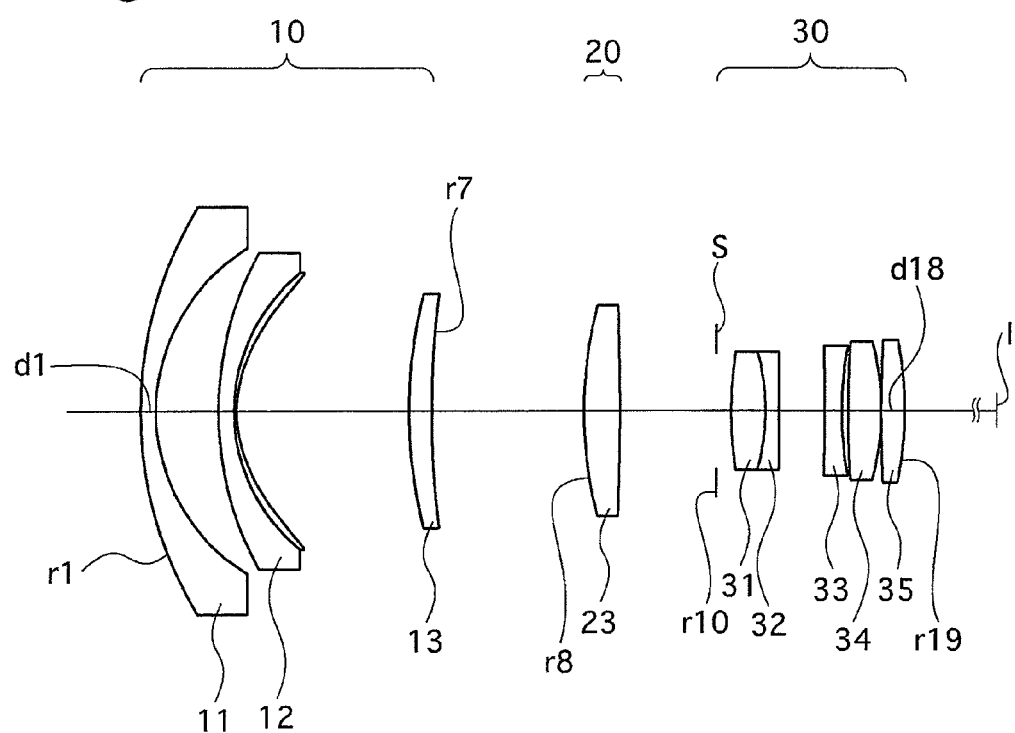
FIG. 37 shows a lens arrangement of a seventh embodiment of a wide-angle zoom lens system when an object at infinity is in an in-focus state at the short focal length extremity.

FIG. 37 shows the lens arrangement of the seventh embodiment of a wide-angle zoom lens system when an object at infinity is in an in-focus state at the short focal length extremity. FIGS. 38A through 38D show aberrations of the lens arrangement shown in FIG. 37. FIGS. 39A through 39C show lateral aberrations of the lens arrangement shown in FIG. 37.

Figure 40:
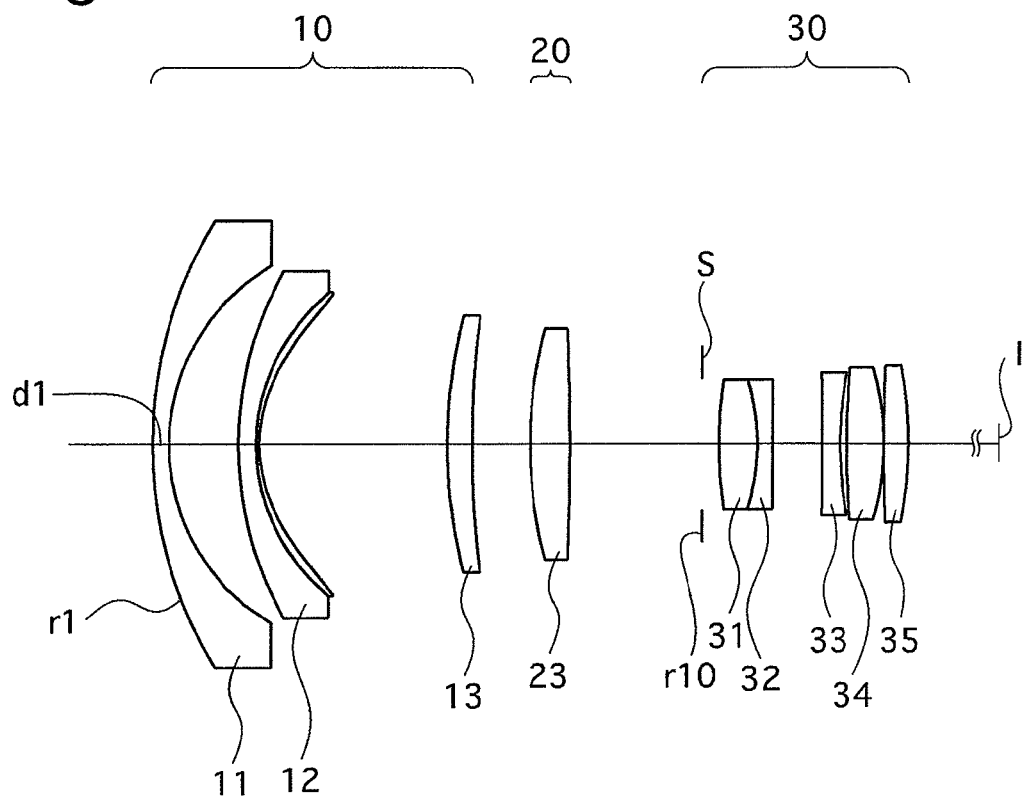
FIG. 40 shows a lens arrangement of the seventh embodiment of a wide-angle zoom lens system when an object at infinity is in an in-focus state at the long focal length extremity.

FIG. 40 shows the lens arrangement of the sixth embodiment of a wide-angle zoom lens system when an object at infinity is in an in-focus state at the long focal length extremity. FIGS. 41A through 41D show aberrations of the lens arrangement shown in FIG. 40. FIGS. 42A through 42C show lateral aberrations of the lens arrangement shown in FIG. 40.

Table 7 shows the numerical data of the seventh embodiment.

The basic lens arrangement of the seventh embodiment is the same as that of the fourth embodiment.

TABLE 7

FNO. = 1:4.0-4.1-4.3
f = 16.27-17.99-20.02 (Zoom Ratio = 1.23)
W = 41.3-38.5-35.5
Y = 14.24-14.24-14.24
BF = 37.17-39.25-41.82
L = 104.32-103.18-102.39
D7 = 13.385-8.992-4.637
D9 = 8.476-9.648-10.649

TABLE 7-continued

| Surf. No. | r | d | Nd | ν |
|---|---|---|---|---|
| 1 | 34.091 | 1.347 | 1.71300 | 53.9 |
| 2 | 16.625 | 5.511 | | |
| 3 | 28.774 | 1.391 | 1.80420 | 46.5 |
| 4 | 15.673 | 0.224 | 1.52972 | 42.7 |
| 5* | 11.700 | 15.045 | | |
| 6 | 42.487 | 1.942 | 1.80518 | 25.5 |
| 7 | 84.974 | D7 | | |
| 8 | 36.911 | 3.187 | 1.67270 | 32.2 |
| 9 | −222.501 | D9 | | |
| 10 (Diaphragm) | ∞ | 1.360 | | |
| 11 | 33.153 | 3.062 | 1.49700 | 81.6 |
| 12 | −17.822 | 1.200 | 1.80610 | 40.7 |
| 13 | −434.082 | 4.000 | | |
| 14 | −474.184 | 1.501 | 1.75520 | 27.5 |
| 15 | 30.429 | 0.550 | | |
| 16 | 80.069 | 2.926 | 1.48749 | 70.4 |
| 17 | −22.480 | 0.000 | | |
| 18 | 147.854 | 2.043 | 1.48749 | 70.4 |
| 19 | −32.000 | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.000 | $0.2683 \times 10^{-5}$ | $-0.3696 \times 10^{-7}$ | $-0.4415 \times 10^{-9}$ |

Zoom-Lens-Group Data

| Lens Group | First Surface | Focal Length |
|---|---|---|
| 1 | 1 | −24.62 |
| 2 | 8 | 47.30 |
| 3 | 11 | 46.72 |

Lens Data at Finite Photographing Distance

| | | Infinity | Intermediate Distance | Minimum Distance |
|---|---|---|---|---|
| (S) Short Focal-Length Extremity | Magnification | 0 | −0.02 | −0.128 |
| | BF | 37.17 | | |
| | D7 | 13.385 | 14.228 | 19.016 |
| | D9 | 8.476 | 7.632 | 2.844 |
| (M) Intermediate Focal-Length | Magnification | 0 | −0.02 | −0.142 |
| | BF | 39.25 | | |
| | D7 | 8.992 | 9.71 | 14.236 |
| | D9 | 9.648 | 8.93 | 4.405 |
| (L) Long Focal-Length Extremity | Magnification | 0 | −0.02 | −0.159 |
| | BF | 41.82 | | |
| | D7 | 4.637 | 5.248 | 9.649 |
| | D9 | 10.649 | 10.038 | 5.638 |

The numerical values of each condition for each embodiment are shown in Table 8.

TABLE 8

| | Cond. (1) | Cond. (2) | Cond. (3) | Cond. (4) |
|---|---|---|---|---|
| Embod. 1 | 2.74 | −0.43 | 0.85 | 3.20 |
| Embod. 2 | 3.19 | −0.42 | 1.22 | 3.48 |

TABLE 8-continued

|         | Cond. (1) | Cond. (2) | Cond. (3) | Cond. (4) |
|---------|-----------|-----------|-----------|-----------|
| Embod. 3 | 3.17 | −0.40 | 1.34 | 3.79 |
| Embod. 4 | 2.61 | −0.48 | 0.71 | 3.26 |
| Embod. 5 | 2.46 | −0.39 | 0.66 | 3.44 |
| Embod. 6 | 2.94 | −0.40 | 1.10 | 3.71 |
| Embod. 7 | 2.87 | −0.52 | 0.92 | 2.91 |

As can be understood from Table 8, the first through seventh embodiments satisfy conditions (1) through (4). Furthermore, as can be understood from the aberration diagrams, the various aberrations are suitably corrected.

According to the present invention, a wide-angle zoom lens system with the following features can be attained:

a miniaturized zoom lens system is attained;

the correcting of aberrations, such as distortion and astigmatism, can be done over the entire zooming range;

aberration fluctuations upon focusing can be reduced by introducing an internal focusing lens arrangement in which the positive second lens group is provided as the focusing lens group; and a short minimum photographing distance is attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle zoom lens system comprises a negative first lens group, a positive second lens group, and a positive third lens group, in this order from an object, wherein upon zooming from the short focal length extremity to the long focal length extremity, each of said negative first lens group, said positive second lens group and said positive third lens group move along the optical axis thereof while a distance between said negative first lens group and said positive second lens group decreases, and a distance between said positive second lens group and said positive third lens group also decreases;

wherein said wide-angle zoom lens system satisfies the following condition:

$$2.45 < f3/fw < 3.5$$

wherein f3 designates the focal length of said positive third lens group; and fw designates the focal length of the entire wide-angle zoom lens system at the short focal length extremity;

wherein said positive second lens group is moved toward the image in order to perform a focusing operation from an object at infinity to an object at a closer distance.

2. The wide-angle zoom lens system according to claim 1, further satisfying the following condition:

$$-0.7 < f1/f2 < -0.2 \quad (2)$$

wherein f1 designates the focal length of said negative first lens group; and f2 designates the focal length of said positive second lens group.

3. The wide-angle zoom lens system according to claim 1, wherein said positive second lens group comprises a positive single lens element.

4. The wide-angle zoom lens system according to claim 1, wherein said positive second lens group comprises a cemented lens having a positive refractive power.

5. The wide-angle zoom lens system according to claim 1, wherein said negative first lens group is divided into a negative first sub-lens group and a positive second sub-lens group at the largest air-distance therebetween in said negative first lens group, in this order from the object; and, wherein said negative first sub-lens group and said positive second sub-lens group satisfy the following condition:

$$0.6 < d1a\text{-}b/fw < 1.35$$

wherein d1a-b designates the air-distance from the most image-side surface of said negative first sub-lens group to the most object-side surface of said positive second sub-lens group; and fw designates the focal length of the entire wide-angle zoom lens system at the short focal length extremity.

6. The wide-angle zoom lens system according to claim 1, wherein said negative first lens group comprises a negative first lens element having a concave surface facing toward the image, a negative second lens element having a concave surface facing toward the image, and a positive third lens element having a convex surface facing toward the object, in this order from the object.

7. The wide-angle zoom lens system according to claim 1, further satisfying the following condition:

$$2.9 < f2/fw < 3.8$$

wherein f2 designates the focal length of said positive second lens group; and fw designates the focal length of the entire wide-angle zoom lens system at the short focal length extremity.

8. The wide-angle zoom lens system according to claim 1, wherein said positive third lens group comprises at least two negative lens elements and at least two positive lens elements; and, wherein one of said negative lens elements and one of said positive lens elements are bonded to each other.

9. A wide-angle zoom lens system comprises a negative first lens group, a positive second lens group, and a positive third lens group, in this order from an object, wherein upon zooming from the short focal length extremity to the long focal length extremity, each of said negative first lens group, said positive second lens group and said positive third lens group move along the optical axis thereof while a distance between said negative first lens group and said positive second lens group decreases, and a distance between said positive second lens group and said positive third lens group also decreases;

wherein said wide-angle zoom lens system satisfies the following condition:

$$2.45 < f3/fw < 3.5$$

wherein f3 designates the focal length of said positive third lens group; and fw designates the focal length of the entire wide-angle zoom lens system at the short focal length extremity;

wherein said negative first lens group is divided into a negative first sub-lens group and a positive second sub-lens group at the largest air-distance therebetween in said negative first lens group, in this order from the object; and, wherein said negative first sub-lens group and said positive second sub-lens group satisfy the following condition:

$$0.6 < d1a\text{-}b/fw < 1.35$$

wherein d1a-b designates the air-distance from the most image-side surface of said negative first sub-lens group to the most object-side surface of said positive second sub-lens group; and fw designates the focal length of the entire wide-angle zoom lens system at the short focal length extremity.

10. The wide-angle zoom lens system according to claim 9, further satisfying the following condition:

$$-0.7 < f1/f2 < -0.2 \quad (2)$$

wherein f1 designates the focal length of said negative first lens group; and f2 designates the focal length of said positive second lens group.

11. The wide-angle zoom lens system according to claim 9, wherein said positive second lens group comprises a positive single lens element.

12. The wide-angle zoom lens system according to claim 9, wherein said positive second lens group comprises a cemented lens having a positive refractive power.

13. The wide-angle zoom lens system according to claim 9, wherein said negative first lens group comprises a negative first lens element having a concave surface facing toward the image, a negative second lens element having a concave surface facing toward the image, and a positive third lens element having a convex surface facing toward the object, in this order from the object.

14. The wide-angle zoom lens system according to claim 9, further satisfying the following condition:

$$2.9 < f2/fw < 3.8$$

wherein f2 designates the focal length of said positive second lens group; and fw designates the focal length of the entire wide-angle zoom lens system at the short focal length extremity.

15. The wide-angle zoom lens system according to claim 9, wherein said positive third lens group comprises at least two negative lens elements and at least two positive lens elements; and, wherein one of said negative lens elements and one of said positive lens elements are bonded to each other.

16. A wide-angle zoom lens system comprises a negative first lens group, a positive second lens group, and a positive third lens group, in this order from an object, wherein upon zooming from the short focal length extremity to the long focal length extremity, each of said negative first lens group, said positive second lens group and said positive third lens group move along the optical axis thereof while a distance between said negative first lens group and said positive second lens group decreases, and a distance between said positive second lens group and said positive third lens group also decreases;

wherein said wide-angle zoom lens system satisfies the following condition:

$$2.45 < f3/fw < 3.5$$

wherein f3 designates the focal length of said positive third lens group; and fw designates the focal length of the entire wide-angle zoom lens system at the short focal length extremity; and further satisfying the following condition:

$$2.9 < f2/fw < 3.8$$

wherein f2 designates the focal length of said positive second lens group; and fw designates the focal length of the entire wide-angle zoom lens system at the short focal length extremity.

17. The wide-angle zoom lens system according to claim 16, further satisfying the following condition:

$$-0.7 < f1/f2 < -0.2 \quad (2)$$

wherein f1 designates the focal length of said negative first lens group; and f2 designates the focal length of said positive second lens group.

18. The wide-angle zoom lens system according to claim 16, wherein said positive second lens group comprises a positive single lens element.

19. The wide-angle zoom lens system according to claim 16, wherein said positive second lens group comprises a cemented lens having a positive refractive power.

20. The wide-angle zoom lens system according to claim 16, wherein said positive third lens group comprises at least two negative lens elements and at least two positive lens elements; and, wherein one of said negative lens elements and one of said positive lens elements are bonded to each other.

* * * * *